(12) United States Patent
Matsutsuka et al.

(10) Patent No.: US 8,127,234 B2
(45) Date of Patent: Feb. 28, 2012

(54) DISPLAY SCREEN STRUCTURING APPARATUS

(75) Inventors: Takahide Matsutsuka, Kawasaki (JP);
Noboru Kurumai, Kawasaki (JP);
Tokuhisa Kadonaga, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 710 days.

(21) Appl. No.: 12/013,020

(22) Filed: Jan. 11, 2008

(65) Prior Publication Data

US 2008/0172624 A1 Jul. 17, 2008

(30) Foreign Application Priority Data

Jan. 12, 2007 (JP) ................................. 2007-005170

(51) Int. Cl.
*G06F 3/14* (2006.01)
*G06F 3/17* (2006.01)

(52) U.S. Cl. ............ 715/752; 715/200; 715/738; 707/2; 709/205; 714/38.1; 717/106; 717/120; 719/314

(58) Field of Classification Search .......... 715/200–277, 715/700–867; 700/701–866; 709/201–229; 705/50–79; 717/120, 106, 124–125; 719/314; 345/30–111; 707/1–10, 100–104.1, 200–206; 714/38.1

See application file for complete search history.

(56) References Cited

U.S. PATENT DOCUMENTS

| | | | |
|---|---|---|---|
| 7,664,990 B2 * | 2/2010 | Kodaka et al. ............... | 714/38.1 |
| 2003/0226115 A1 | 12/2003 | Wall et al. | |
| 2006/0075382 A1 * | 4/2006 | Shaburov ...................... | 717/106 |
| 2006/0212842 A1 | 9/2006 | Gossman et al. | |
| 2007/0124278 A1 * | 5/2007 | Lewis et al. ........................ | 707/2 |
| 2007/0283273 A1 * | 12/2007 | Woods ........................... | 715/738 |
| 2008/0065974 A1 * | 3/2008 | Campbell ...................... | 715/200 |
| 2008/0066080 A1 * | 3/2008 | Campbell ...................... | 719/314 |
| 2009/0013310 A1 * | 1/2009 | Arner et al. .................... | 717/120 |
| 2009/0172101 A1 * | 7/2009 | Arthursson .................... | 709/205 |

FOREIGN PATENT DOCUMENTS

| | | |
|---|---|---|
| JP | 2002-214394 | 8/2002 |
| JP | 2002-215394 | 8/2002 |
| JP | 2003-150290 | 5/2003 |
| JP | 2004-318848 | 11/2004 |
| JP | 2006-260540 | 9/2006 |

OTHER PUBLICATIONS

Japanese Office Action issued May 11, 2010 in corresponding Japanese Patent Application 2007-005170.
"Calculate the Sum of Entered Items", (URL: http://javascript.ewebdesign.com/1208_it.html), Aug. 11, 2004, eWeb.
Y. Nomura, et al., "GUI Component of Web Application Framework "UJI"", pp. 17-23, IPSJ SIG Note, vol. 2000, No. 104, Information Processing Society of Japan.
Japanese Office Action issued on Jun. 2, 2009 in corresponding Japanese Patent Application 2007-005170.

* cited by examiner

*Primary Examiner* — Ruay Ho
(74) *Attorney, Agent, or Firm* — Fujitsu Patent Center

(57) ABSTRACT

A screen program described with a non-object-oriented language is divided into a View performing a screen display and a Model that is an external processing logic of the screen display, and the View is associated with the Model by a binding setting. By associating plural Views with a Model, when the display has the same values in plural screens, the same processing result can be displayed on all screens only by processing the Model. The Model is associated with a schema describing a limitation of the input value from the screen, and a check of whether the input value from the screen is in the correct form or not is performed collectively.

7 Claims, 26 Drawing Sheets

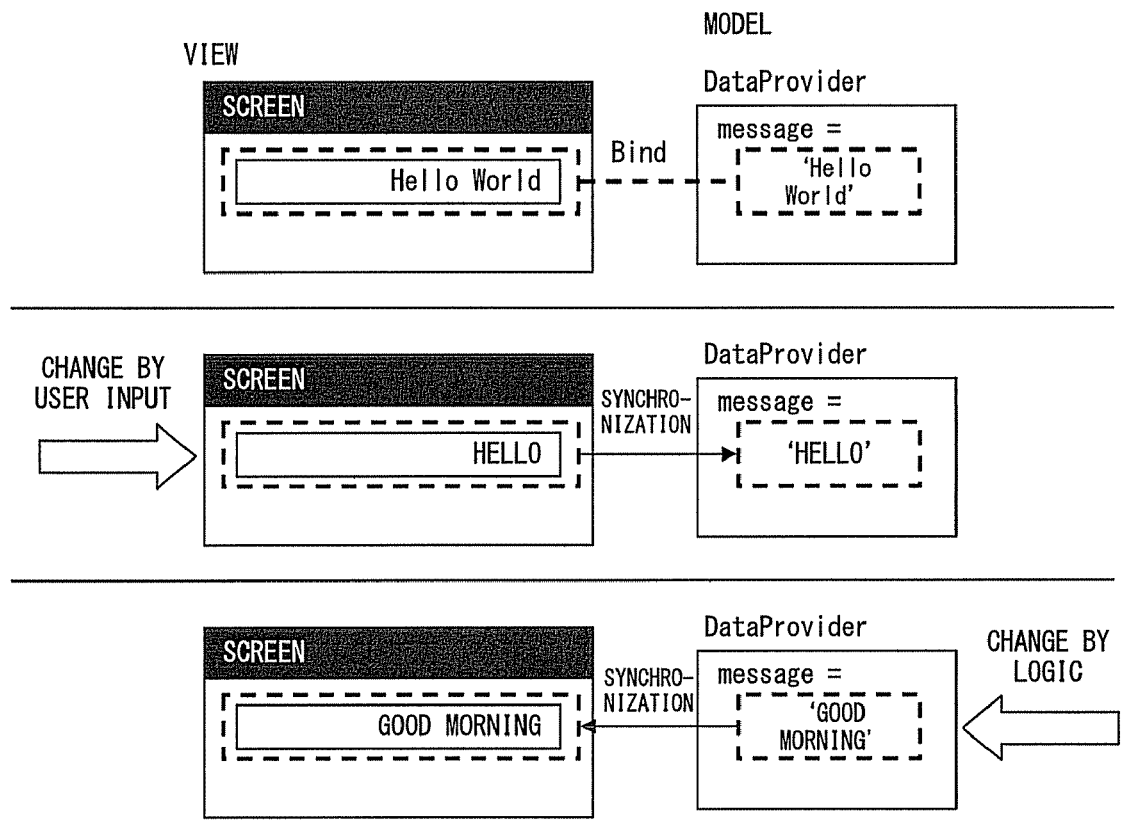
F I G. 4

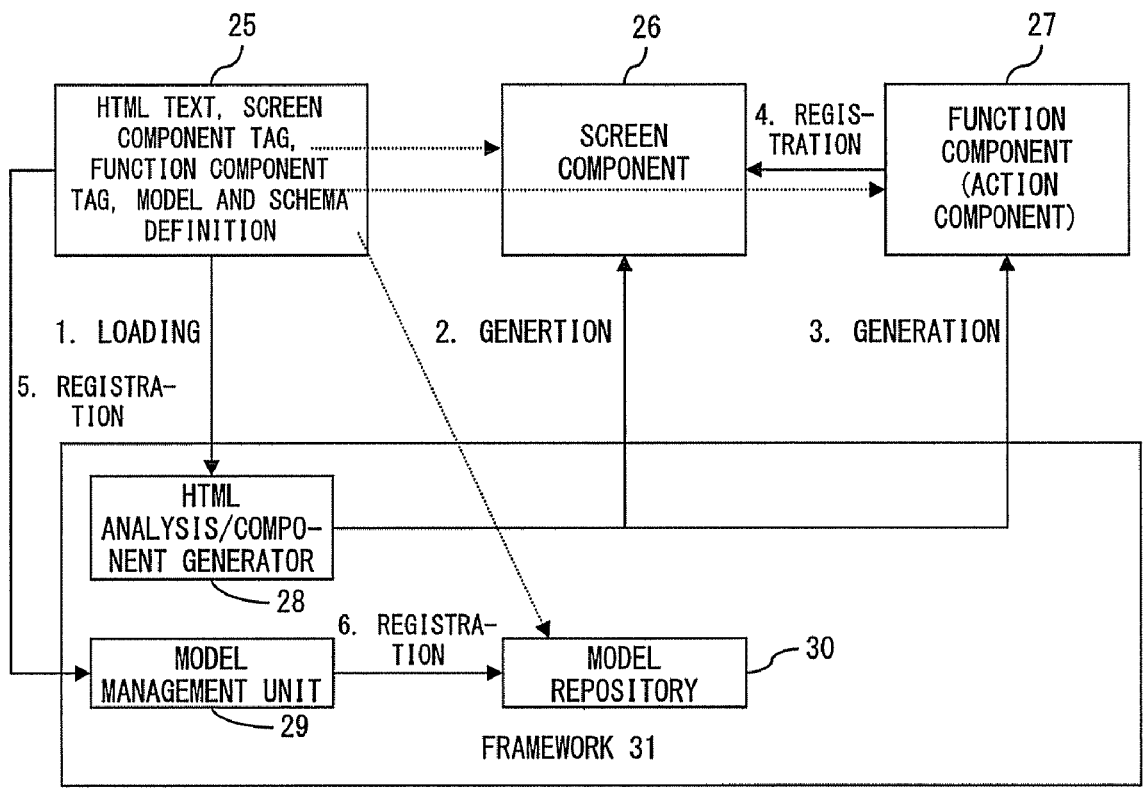
F I G. 6

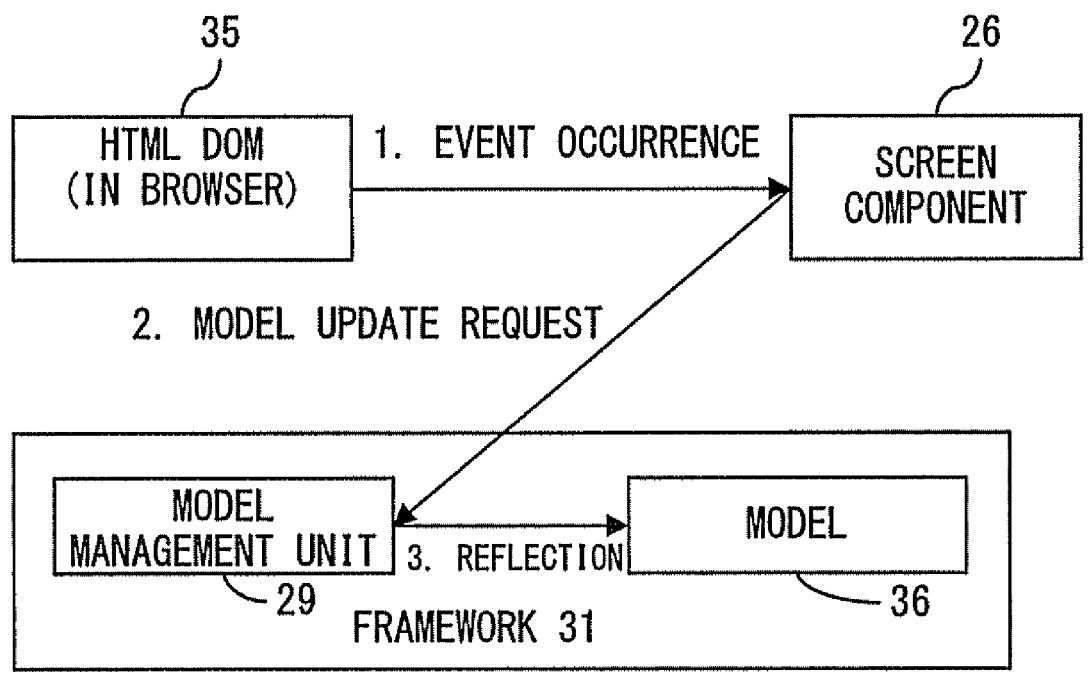
F I G. 7

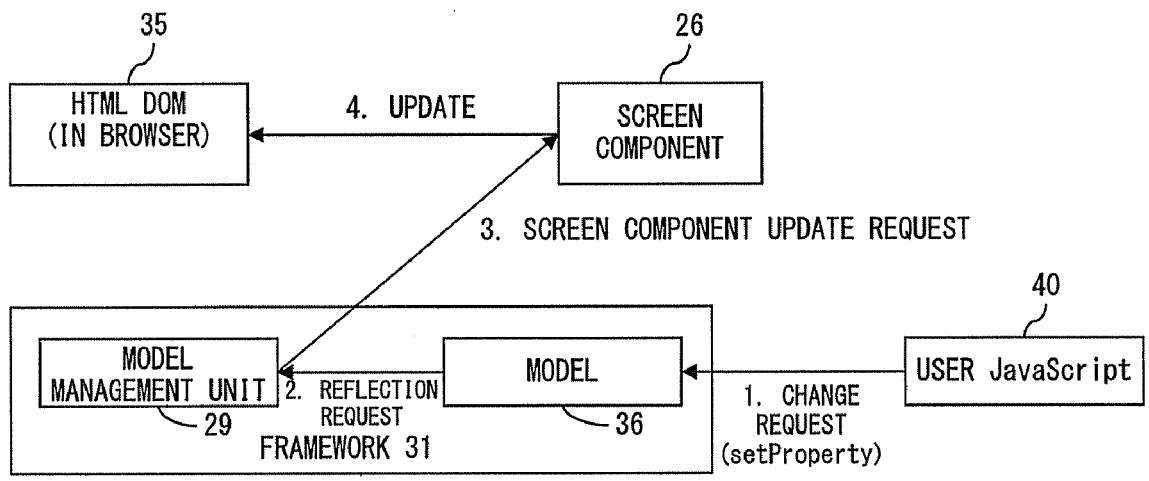
F I G. 8

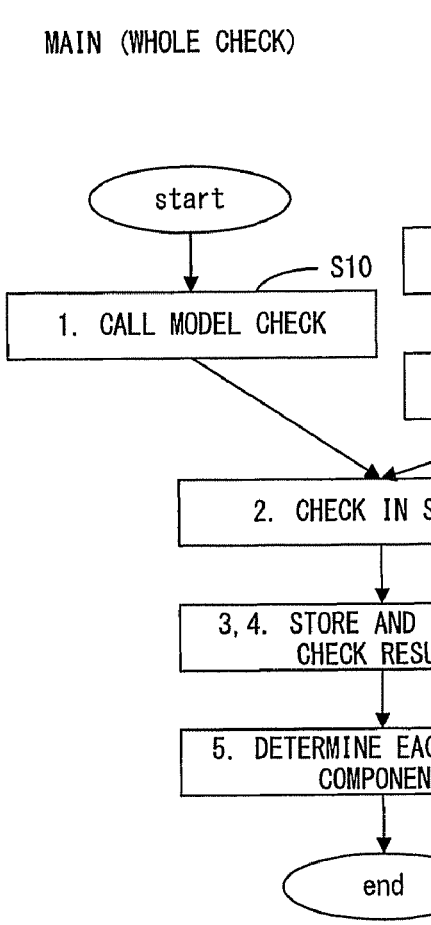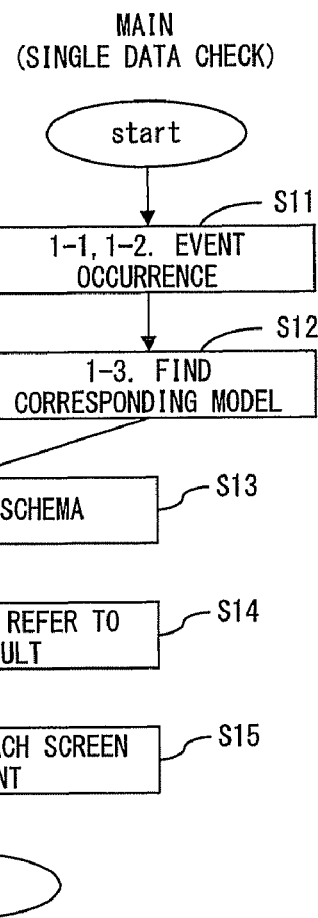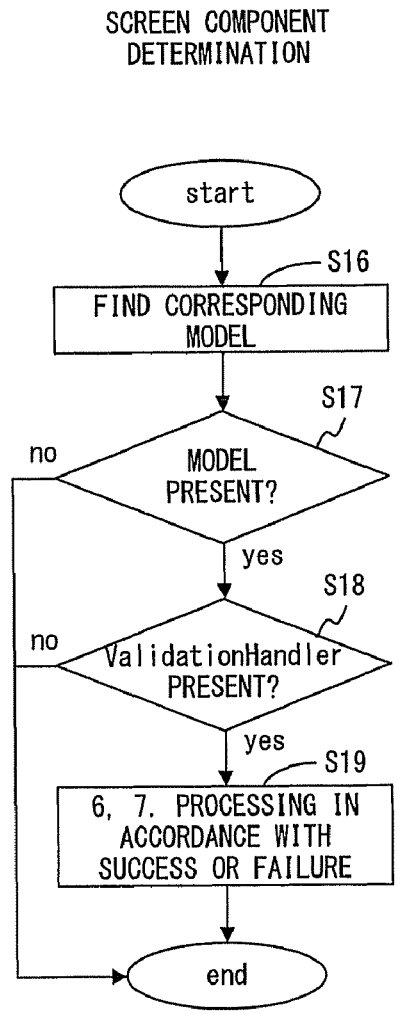
FIG. 11A  FIG. 11B

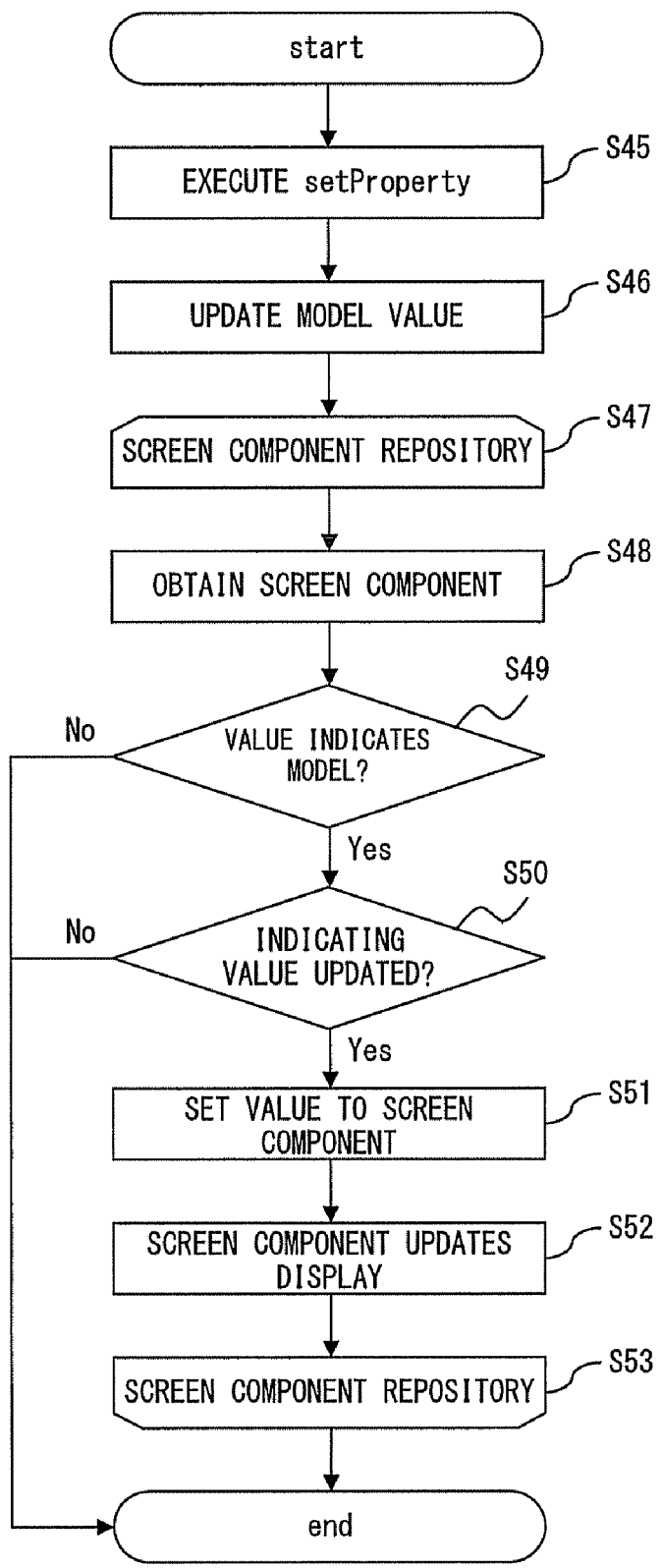
F I G. 15

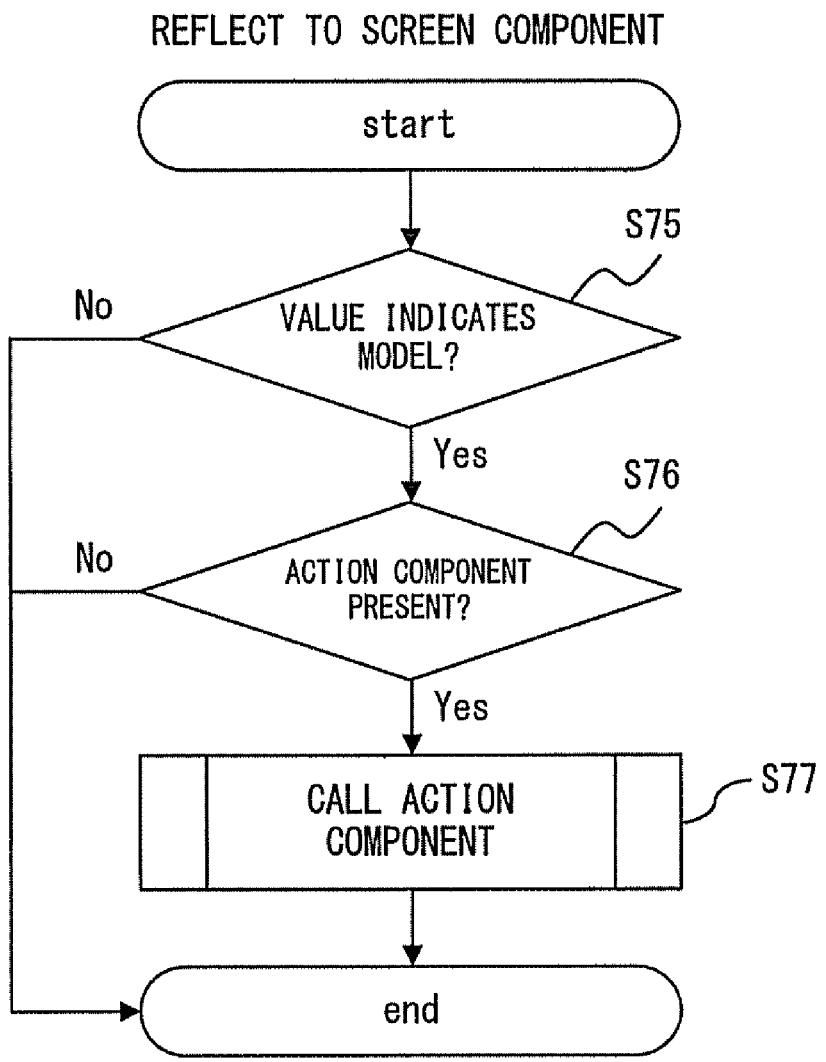
F I G. 19

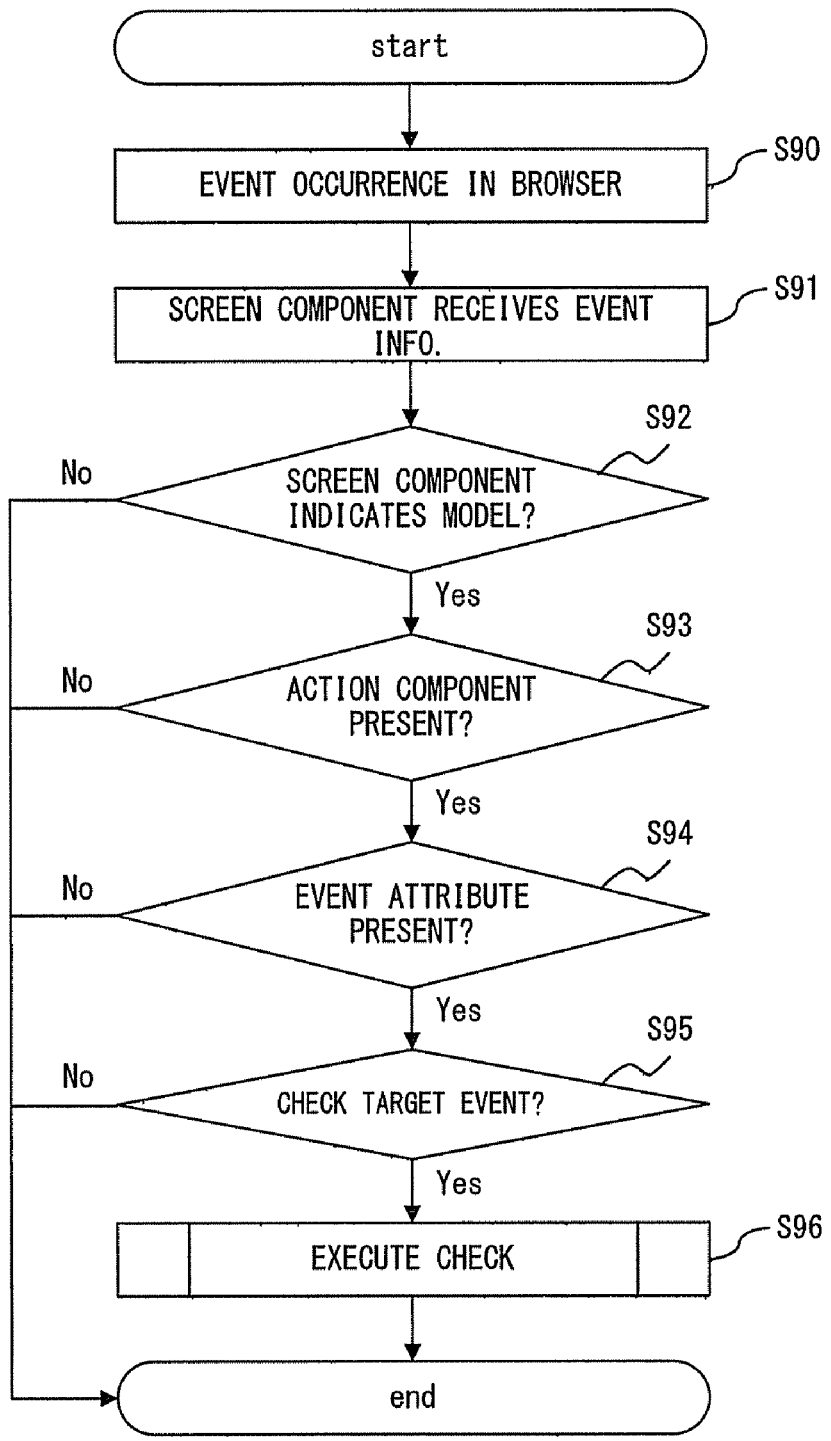
F I G. 21

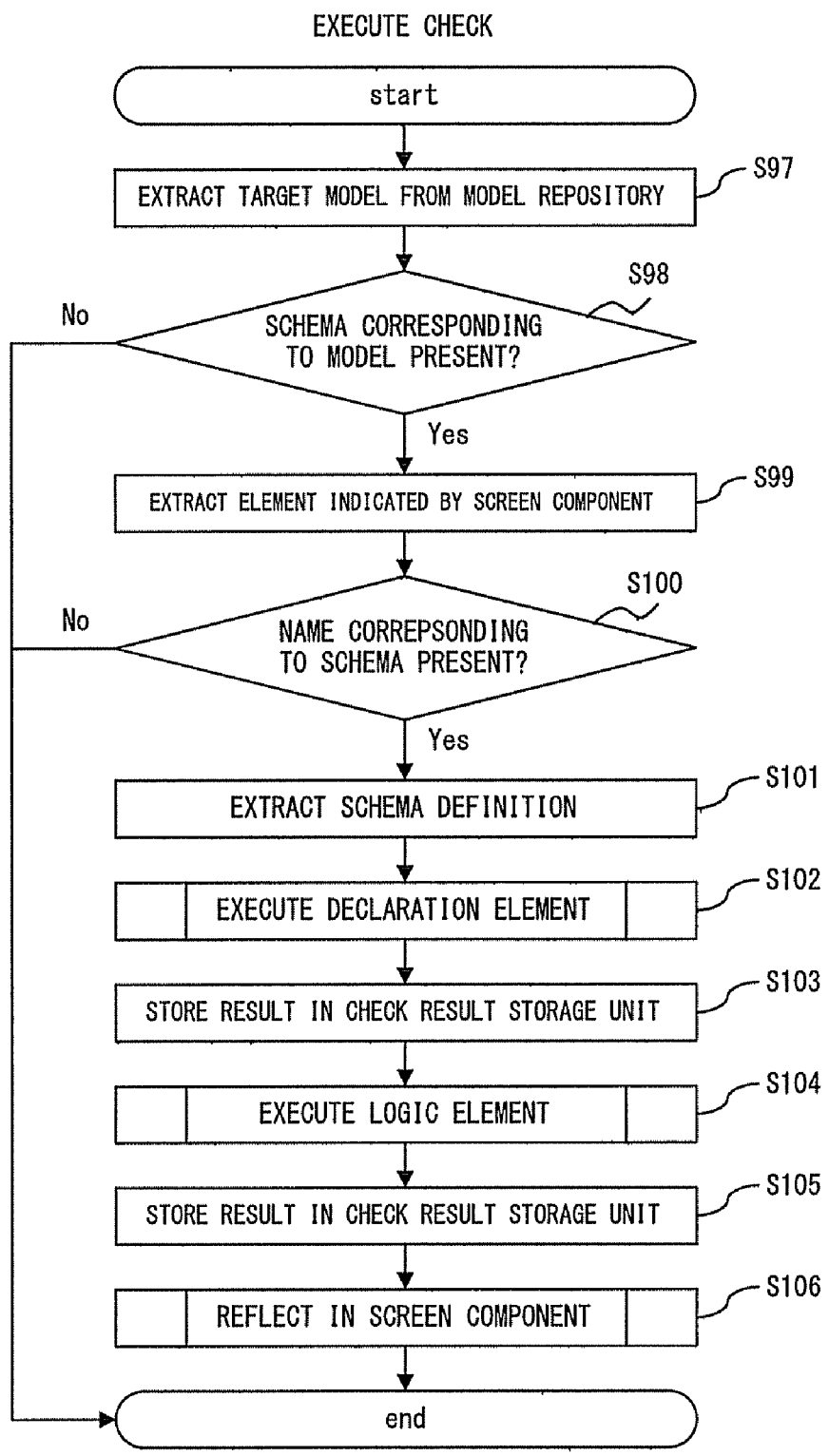
F I G. 2 2

DISPLAY SCREEN STRUCTURING APPARATUS

BACKGROUND OF THE INVENTION

1. Field of the Invention

The present invention relates to a display screen structuring apparatus for structuring screens displayed on a monitor screen of a computer.

2. Description of the Related Art

In conventional server/client systems, when data is input from a client screen, the input content displayed on the client screen is transmitted as a message to a server. After being processed in the server, the message is returned to the client and displayed on the client screen.

Recently, when the Internet has been browsed using programs written in JavaScript (Registered Trademark) such as Ajax, the data input from a client end has been processed in the client terminal. In other words, the data input by a user is processed at the client end after being displayed, and the processed data is displayed on another screen that is on the display screen of the client terminal. For the screen display, there are screen components that are programs for displaying each screen. When the data input by a user is processed on a screen and is displayed on the next screen, the data input by a user is sent from one screen component to another.

In the past, in rich client applications using JavaScript (Registered Trademark) such as Ajax, data exchange between screen components occurred frequently so that the data displayed by the screen component could be controlled. For example, when "input screen" is shifted to "confirmation screen", the data input by a screen component of the input screen has to be copied to a screen component of the confirmation screen. The amount of such processing increases in proportion to the number of input items, and becomes a burden to the programs.

In addition, when the input content is checked, two types of processing, i.e., checking an input value and updating a screen in accordance with the check result, are performed, and because these two are performed on each screen component, the maintenance is not easy.

While JavaScript (Registered Trademark) is a non-object-oriented language, in the object-oriented languages, in order to address such a problem, the concept of an MVC (Model, View, Controller) model is introduced.

The MVC model is a technique commonly used in object-oriented languages such as Java (Registered Trademark). However, because programs are not independent in each component in non-object-oriented languages such as JavaScript (Registered Trademark), it is difficult and problematic to handle the programs independently and to associate the independent programs with each other. In particular, in a case in which the MVC model is introduced in the non-object-oriented language, it is difficult to realize the synchronization mechanism from the Model to the View.

FIG. 1 and FIG. 2 are diagrams, each of which show a flow of conventional program processing using JavaScript (Registered Trademark).

In an initializing operation for display in FIG. 1, a framework 11 loads HTML text, a screen component tag, and an external check script 10. The framework 11 is, for example, a program that is loaded by a web browser and that performs processing of interpreting the HTML texts and generating a display in accordance with the interpretation result. Loading is performed by an HTML analysis-component generator 13 of the framework 11, and the HTML analysis-component generator 13 analyzes the HTML texts and generates necessary screen components. The screen component 12 is generated in accordance with the content of the HTML text, screen component tag, and external check script, and has a function of, for example, checking input data.

FIG. 2 is a diagram explaining conventional displaying operations of the screen components.

When an event occurs in a browser, an event analysis unit 18 of a screen component 16 is notified of the event occurrence. Here, an HTML DOM (HTML Document Object Model) 15 is a standard processing function of HTML documents that is implemented in browsers. When the event analysis unit 18 specifies the type of event that occurred, an internal check unit 19 performs a check of the event in the screen component (e.g., a check of whether the input content is correct or not). After the internal check, an external check unit 20 calls for an external check script 17 to perform check processing of the input, which is not performed in the internal check. After the processing of the external check unit 20 ends, a screen update unit 21 requests the browser to update the display content. In addition, the external check script 17 independently requests the browser to update the display content.

In order to check the input value, the processing in FIG. 2 is performed; however, because the processing is performed for each of the screen components, the check mechanism is separated for each component, and therefore maintenance becomes difficult.

Patent Document 1 discloses a method in which "data conversion command" is provided in a skeleton program, and the content of the command is replaced in accordance with the input data.

[Patent Document 1]

Japanese Patent Application Publication No. 2003-150290

SUMMARY OF THE INVENTION

The object of the present invention is to provide a display screen structuring apparatus that allows, in a screen component written in a non-object-oriented language, performance of a check of input values without having a mechanism for performing the check of input values in each screen component.

The display screen structuring apparatus of the present invention is a display screen structuring apparatus structuring a display screen using a description of a non-object-oriented language, comprising: view means displaying a display screen, receiving an event input of a user from the display screen, performing internal processing of the event input, and conducting a display reflecting a result of the internal processing on the display screen; model means that is provided separately from the view means and that is associated with the view means by a binding function, said model means performing external processing of the event input received via the view unit, and providing a result of the external processing to the view means and reflecting the result on the display screen; and schema means examining whether or not an input value of the event input received by the model means satisfies a prescribed condition and reflecting the result on the display screen as a result of the external processing of the model means.

According to the present invention, it is possible to eliminate the need for having an input value check mechanism for each screen component, to facilitate the programming, and to control the increase in the number of components even in non-object-oriented languages.

BRIEF DESCRIPTION OF THE DRAWINGS

FIG. 4 is a diagram (2) explaining a principle of the present invention;

FIG. 6 is a diagram explaining operations in the initialization of a system when the MVC is realized by the non-object-oriented language;

FIG. 7 is a diagram explaining operations, when an input value in the screen component is changed, to reflect the change in the value in the Model FIG. 8 is a diagram explaining the operations when a change in the Model is reflected in the screen component;

FIGS. 11A and 11B are diagrams integrating the operations in FIG. 9 and FIG. 10 as a processing flow;

FIG. 15 is a detailed processing flow of a case in which there is a change in the Model and the change is reflected on the screen;

FIG. 19 is a detailed processing flow (4) explaining the checking operation processing when the check is performed entirely;

FIG. 21 is a detailed processing flow (1) explaining the checking operation processing when the single data check operation is performed;

FIG. 22 is a detailed processing flow (2) explaining the checking operation processing when the single data check operation is performed;

DESCRIPTION OF THE PREFERRED EMBODIMENTS

Figure 1:
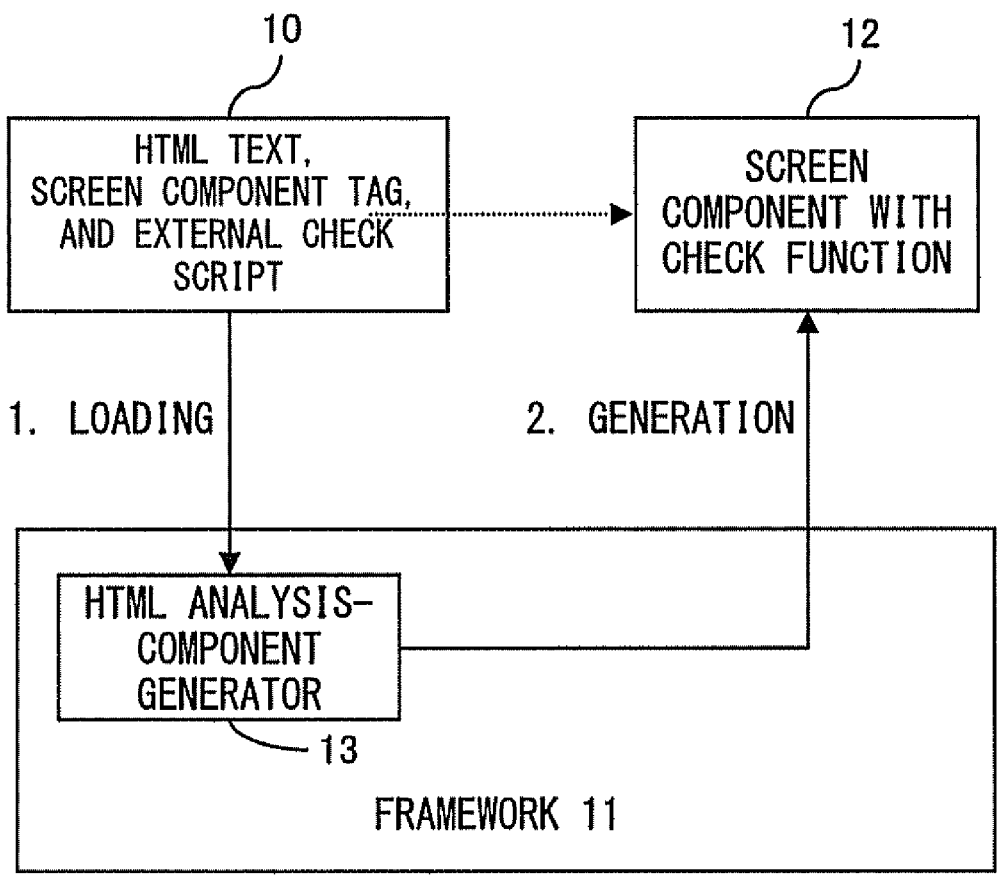
FIG. 1 is a diagram showing a processing flow (1) of a conventional program using JavaScript (Registered Trademark)
Figure 2:
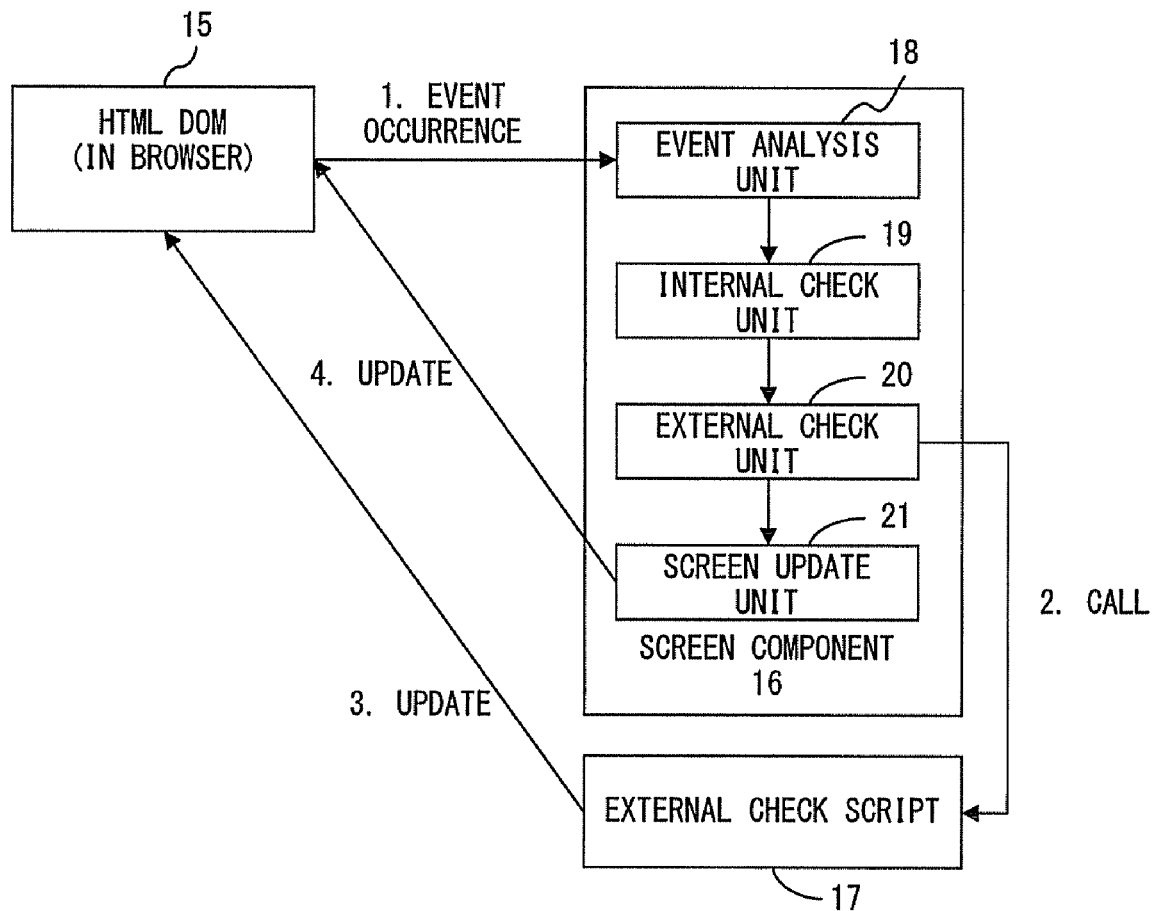
FIG. 2 is a diagram showing a processing flow (2) of a conventional program using JavaScript (Registered Trademark)
Figure 3:
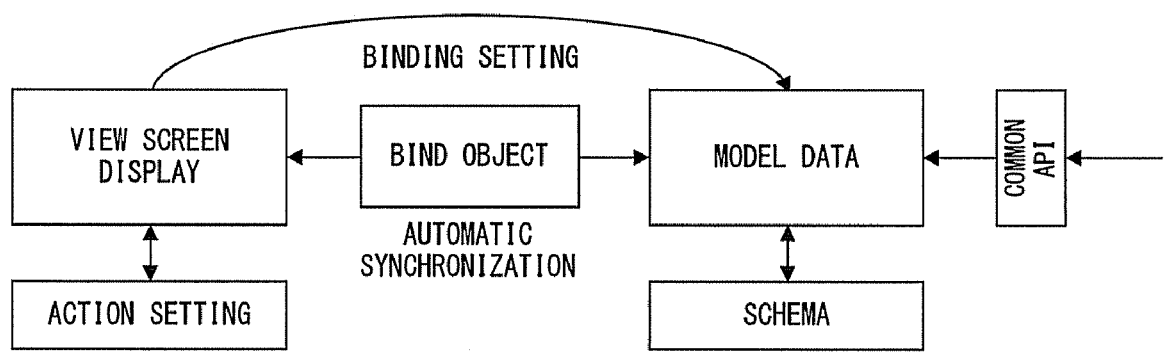
FIG. 3 is a diagram (1) explaining a principle of the present invention.
Figure 5:
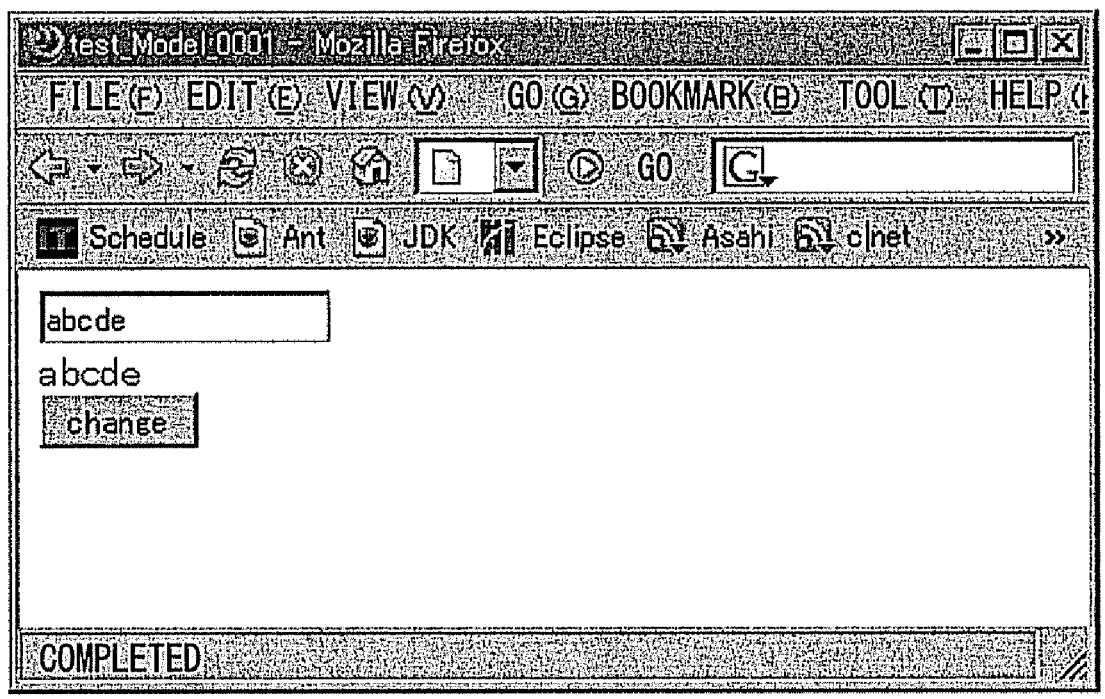
FIG. 5 is a diagram (3) explaining a principle of the present invention.

FIG. 3 to FIG. 5 are diagrams explaining a principle of the present invention.

As shown in FIG. 3, the embodiments of the present invention enable automatic updating of data in JavaScript (Registered Trademark) by separating the Model (a set of processing logic for the display screen) and the View (programs for screen display) and connecting the Model to the View using☐a binding mechanism. The Model is checked based on a schema description (program statements describing the limitation of input display content), and the check is automatically reflected in the View. An action setting specifies actions that should be taken by the View when prescribed events happen to the View. The Model accepts operations from other applications via a common API (Application Program Interface).

In other words, the MVC model is introduced to the JavaScript (Registered Trademark) in a manner such that the processing logics, the screen components, and the other logics written by JSON (JavaScript Object Notation), which is the object notation of JavaScript, (Registered Trademark) are introduced to the Model, to the View, and to the controller, respectively.

Here, a mechanism in which the View indicates which data in the Model is to be displayed/input by using the feature "binding" is introduced from the View to the Model. As shown in FIG. 4, by introducing this feature for automatic synchronization of the View and the Model in accordance with the definition of the binding, a change in the screen component (e.g., character input into a text field) is automatically reflected in the Model, and a change in the Model (e.g. a change as a result of communications with a server) is automatically reflected in the screen component.

In addition, because the binding of plural screen components to one set of Model data is possible, operations such as data copying from the input screen to the confirmation screen are automatically reflected via the Model, and as a result, the need for the writing of programs to copy the data is eliminated.

By having a definition of the attribute of the Model, this attribute being referred to as a "schema" and being associated with the Model, and a definition of the processing of the check result of the schema, this processing being referred to as an "action" and being associated with the View, a check of Model validity and an automatic reflection of the check result in the View are realized.

FIG. 5 shows an example of a display of the View containing a text field that is bound to the Model.

In the case of binding a Model to the text field in FIG. 5, the following is written.

```
model={name:'abcde',price:'1000'};
RCF.bind('model',model);
<div rcf: id = "text1" rcf : type = "TextInput" rcf : value = "{model.
name}" > </div>
```

```
<div rcf : id = "text2" rcf : type = "Text" rcf : value = "{model.
name}" > </div>
```

A definition of the Model is provided in the first line, and the name of the Model and the value "1000", given as a price, are defined. The statement RCF.bind is a statement for binding the View described by the div tag to the Model. The upper statement of the View described by the div tag is for displaying a text box for text input and the lower statement is a statement of the View for displaying the input text.

When the browser downloads HTML, a framework is downloaded according to a script loading instruction for the framework given in the HTML. The script for downloading the framework is given in the HTML as below.
<script src="rcf.js"></script>

Although the framework may consist of plural script files, users only have to describe the loading instruction of rcf.js set forth above, because rcf.js automatically loads the other files.

The operations of the framework start when the HTML loading ends. The framework first performs an analysis of the HTML. In accordance with the tag described in the HTML, screen components and function components are generated.

A technology in which a program for screen display is divided into the screen component and the function component is described in Japanese Patent Application Publication No. 2007-2864 filed by the same applicant as the applicant of the present invention.

In the JavaScript (Registered Trademark) of the other loaded files or in HTML, the following is written as the Model definition and the schema definition.

```
model1= { name: 'abcde', price: '1000' };
schema1 = { price: { type: integer, check: function(value) { if
(value < 0) return false; else return true; } } };
RCF.bind('model', model1, schema1);
```

The model1 variable is the Model definition, and schema1 variable is the schema definition. These are associated by the RCF.bind command. Although the association is performed in response to a command of JavaScript (Registered Trademark) here, the association can be performed by describing it with tags. In such a case, the tag is written as follows.

```
<div  rcf:id="model"  rcf:type="Model"  rcf:model="model1"
rcf:schema="schema1"></div>
```

Here, the variable model1 can be used as a Model named "model".

At that time, a Model management unit is activated in the framework, and the Model is registered in a Model repository under the name "model". If a schema is designated, the schema is registered together with the Model.

As a result of binding, it is possible to have a value input in one screen be automatically reflected in another screen.

The binding is written as below.

```
<div          rcf:id="a"           rcf:type="TextInput"
rcf:value="{model.price}"></div>
<div rcf:id="av" rcf:type="ValidationHandler" rcf:target="a"
```

```
rcf:event="blur"
rcf:success="a.color='black'" rcf:fail="a.color='red'"></div>
```

The TextInput component is a component for performing text input. Here, by writing rcf:value="{model.price}", the TextInput component is bound to the price variable of the Model with the name "model". In other words, when a value is input into the TextInput component, the value is carried to the price variable of the model1. Note that here an action component corresponding to the TextInput is also written (as a component named ValidationHandler in this example, which is a program component for determining whether an input value is input in a correct format or not).

When the TextInput component is changed, this event is reported to the screen component. The content is carried to the Model management unit, and eventually the content of the bound Model is changed. In contrast, when the price variable of the Model is changed, the content is carried to the text field, and the display is changed automatically. However, when changing the price variable, the value cannot be carried to the text field by simply assigning a value in such a manner as model1.price=2000;

This is because the framework cannot detect the execution of the above command due to the limitation in the language specification. Instead, the value is changed by using the command of the framework.
model.setProperty("price", 2000);

By changing the price variable by using the above command, the changed value can be automatically carried to the text field.

There are two possible types of methods that can be employed to check the value: a method for checking the whole Model and a method for checking the data in a single screen component only.

In the case of the method for checking the whole Model, a check execution instruction is issued from a script of a user to the Model management unit. With the issuing of the instruction as a trigger, the check begins. The check is performed with the use of a schema. The definition of the schema enables the checking of whether the type and the other aspects of a model with the same name attribute as the Model match those of the Model or not. In the case of the above example,

```
model1= { name: 'abcde', price: '1000' };
schema1 = { price: { type: integer, check: function(value) { if
(value < 0) return false; else return true; } } validateAll:
function(value, result) { if (value.name == "afo" && value.price
== 2000) { result.name = false; result.price = false; return
false; } else true; } };
```

Here, two things to be checked are defined for the attribute "price".

```
type: integer
check: function(value) { if (value < 0) return false; else return
true; } }
```

These define two things:
price has to be an integer; and
price has to be larger than 0
As is evident from the above, there are two kinds of things to be checked, a declarative description such as the type and a logical description such as the check.

Examples of the things that can be written in the declarative description include the following.
type: data type such as integer, float, and string
length: data string length
minValue, maxValue: the minimum or maximum value when data is a numerical value If what was written in the declarative description as above cannot be checked, it can be checked with the use of the logical description. In such a case, "check" should be used.

Further, in order to perform a relative check between plural values, the check can be performed with "validateAll". The "validateAll" has to be written using a function at all times. The Model to be checked is provided as the value argument of the "validateAll", and a check of mixed various values in the Model can be performed. In the case of the above example, the check is considered to be a failure when the name of the Model is "afo", and the price is 2000. At that time, a check result unit described later receives the result as a result argument, and an arbitrary check result is stored in the check result unit. In the above case, the result unit stores the result in which a check of both the name attribute and price attribute failed.

The checked contents are stored in the check result unit. The check is performed for all attributes (such as type and check), and if any of the attributes has an error, the check fails. Such information is stored in the check result unit. All of the failure information is stored in the check result units. As a result, the action components can identify the failed checks afterwards.

In the above examples of "check" and "validateAll", only two kinds, true (check succeeded) and false (check failed), are provided; however, it is also possible to store any object such as an Error object when the check has failed. The following description is a possible example.

```
check: function(value) { if (value < 0) return throw new
Error("value has to be positive"); else return true; } }
validateAll: function(value, result) { if (value.name == "afo"
&& value.price == 2000) { result.name = new Error("wrong name");
result.price = new Error("wrong price"); return false; } else
true; }
```

The above schema does not have the definition corresponding to the name attribute. In such a case, the check is not performed, and the check result is assumed to be that the check succeeded at all times. When the check ends, the Model management unit refers to the check result and notifies the corresponding screen component that is bounded to the Model of the check result. In the screen component, upon receiving the check result and only in the presence of an action component, the check result is transmitted to the action component.

The action component defines the operations to be performed in cases in which the check succeeds and cases in which the check fails respectively. The case of the above example is as follows.

```
<div rcf:id="av" rcf:type="ValidationHandler" rcf:target="a"
  rcf:event="blur"
  rcf:success="a.color='black'" rcf:fail="a.color='red'"></div>
```

Here,
rcf: success is to be executed when the check is successful, and
rcf: fail is to be executed when the check fails.

In the above example, when the check succeeds, the color of the corresponding screen component (TextInput in this case) is made black (a. color='black'), and when the check fails, the color of the corresponding screen component is made red.

In the action component, it is possible to designate an external function in order to perform further complicated operations.

```
<div rcf:id="av" rcf:type="ValidationHandler" rcf:target="a"
  rcf:event="blur"
  rcf:success="successProcess(a,                        result)"
  rcf:fail="failProcess(a, result)"></div>
function successProcess(target, result) {
...
}
function failProcess(target, result) {
...
}
```

With the above text, "successProcess" or "failProcess" is called in the event of a success or failure, respectively, and detailed operations can be written for each case of the "successProcess" or "failProcess". Here, the "target" variable is a screen component to be changed and "result" is a check result. Note that nothing particular is performed when no action component is associated with the screen component.

Meanwhile the check can be performed on single pieces of data. For example, the above action component has a definition as below.
rcf:event="blur"
This definition indicates that the check is started when the target component is out of focus (when a cursor is moved to another position).

In the following a flow of the processing is described.

First, an event occurs in the browser. The information of the event is carried to the action component, and if the event is the same as the event to which the check execution instruction is issued (in the above example, if the component is out of focus), the check execution is started in the Model management unit.

Although the operations following the above operation are about the same as in the case of checking the whole Model, there is a difference from the check of the whole Model in that only the data associated with the screen component that triggered the check execution. Because the "validateAll" is executed only when the association of plural data is checked, the "validateAll" is not called when a single piece of data is checked.

The check by a schema is performed only on the data to which the screen component is bound, and the check result is carried only to the screen component that triggered the check.

According to the above configuration, the MVC is realized in JavaScript (Registered Trademark), which is a non-object-oriented language. In addition, by preparing "schema" with the Model, the data check is realized in the same granularity (unit) as that of the Model. As a result, the effect that can be obtained is such that the check logic does not vary from one component to another. Because the check processing and the screen operation are separated, it is possible to segregate the actions taken against errors for each component in cases in which the same Model data is displayed in plural places on a screen. Further, in JavaScript (registered Trademark), it is possible to cause the server to perform the check if necessary. Accordingly, both the value check for individual data and the value check in the whole Model can be performed within a single mechanism.

FIG. 6 is a diagram explaining operations in the initialization of a system when the MVC is realized by the non-object-oriented language.

First, an HTML analysis/component generator 28 in a framework 31 loads an HTML text, a screen component tag, a function component tag, a Model and a schema definition 25. The HTML analysis/component generator 28 generates a screen component 26 and a function component (action component) 27 based on the screen component tag and the function component tag. The function component 27, which is associated with the screen component 26, handles the execution of the processing in response to inputs to the screen component 26, and the screen component 26 and the function component 27 correspond to the View in the MVC model. The Model and the schema definition are registered in a Model repository 30 by the Model management unit 29.

FIG. 7 is a diagram explaining operations that are performed when an input value in the screen component is changed to reflect the change in the value in the Model.

When an event that involves a change in the screen component occurs at an inner browser 35, the change is made to the screen component 26. The screen component 26, when the change occurs, requests the Model management unit 29 of the framework 31 to reflect the change in the Model. The Model management unit 29 reflects the change made to the screen component 26 in the Model 36, and ends the processing.

FIG. 8 is a diagram explaining the operations performed to reflect a change in the Model in the screen component.

A change request is made to the Model 36 by JavaScript (Registered Trademark) 40 written by a user. The change request to the Model 36 is made, for example, by a setProperty command. When a change is made in the Model 36, a request to reflect the change in the screen component 26 is made from the Model 36 to the Model management unit 29. After receiving the request, the Model management unit 29 requests that the screen component 26 be updated. In response to the request, the change made to the Model 36 is reflected in the screen component 26. The screen component 26, when receiving the change, updates the browser display in an HTML DOM 35 in the browser. As a result, a change in the screen component 26 changes the display on the browser and is displayed.

Figure 9:
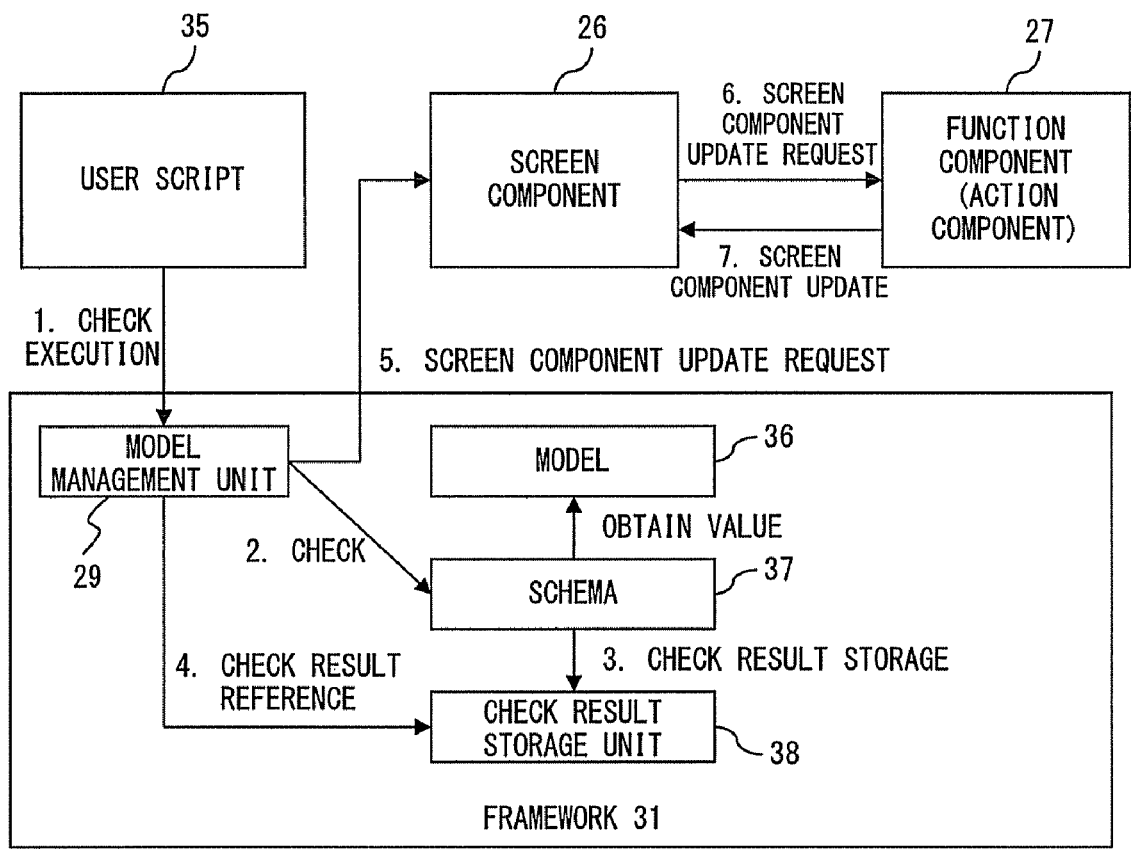
FIG. 9 is a diagram explaining the operations when the values input onto the screen are checked by using a schema.

FIG. 9 is a diagram explaining the operations performed to check the values input onto the screen by using a schema.

The user script 35 executes the check of the values. The Model management unit 29 of the framework 31 requests the schema 37 to execute the check of the values. The schema 37 obtains a value of the Model 36, checks whether the value satisfies prescribed conditions or not, and stores the check result to a check result storage unit 38. The Model management unit 29 refers to the check result in the check result storage unit 38, and makes a request to change the screen component in accordance with the check result to the screen component 26. For example, when the value is not correct, the value is indicated in red. The screen component 26 makes a screen component change request to the function component 27 handling the processing for the screen input. The function component 27, in accordance with the request, updates the screen component and ends the processing.

FIG. 9 describes a case of the performance of a whole check of values that are all displayed values associated with the Model.

Figure 10:
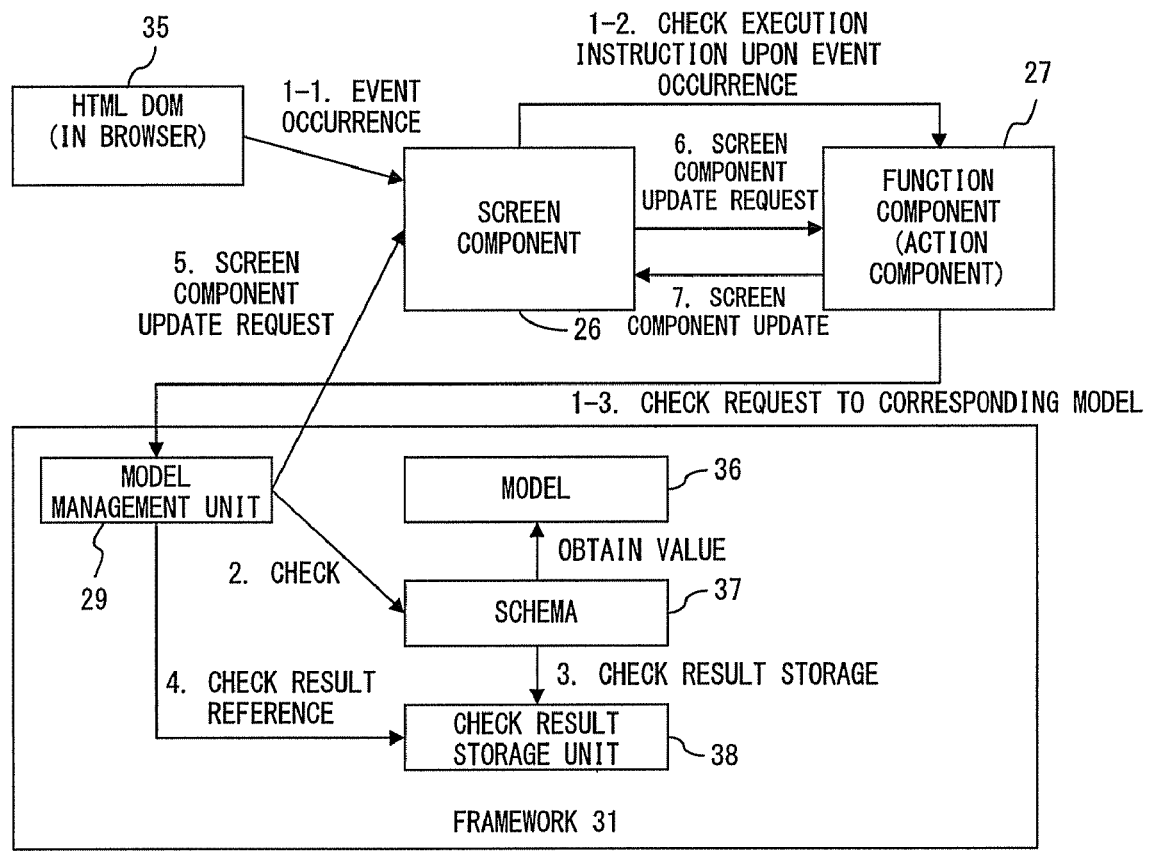
FIG. 10 is a diagram explaining the operations of the value check that checks only a single input.

FIG. 10 is a diagram explaining the operations of the value check that checks only a single input.

When an event occurs in the inner browser 35, the screen component 26 detects the event occurrence. In this case, such an event occurrence includes for example being out of focus. As a result, the screen component 26 sends an execution instruction of the input value check to the function component 27. The function component 27 sends a check request for the values input into the Model that corresponds to the occurred event to the Model management unit 29 of the framework 31. The Model management unit 29 sends a request for check execution to the schema 37, and the schema 37 obtains the values from the corresponding Model 36, executes the check, and stores the check result in the check result storage unit 38. The Model management unit 29 refers to the check result stored in the check result storage unit 38, and sends a screen component change request to the screen component 26. The screen component 26 that received the screen component change request sends a screen update request to the function component 27, and the function component 27 updates the screen component 26. As a result of this operation, if the input value does not satisfy the conditions provided in the schema, a change in the display such as displaying the input value in red is enacted.

The operation in FIG. 10 is a single data check operation for only a single input value, and the check operation is performed, for example, on only the value input into a textbox.

FIGS. 11A and 11B are diagrams integrating the operations in FIG. 9 and FIG. 10 and describing them as a processing flow.

In FIG. 11A, processing flows are shown of a case of checking the values in a whole Model and of a case of checking a value of a single event. When the whole Model check is performed, in step S10, the check processing of a Model that is a script generated by a user is called, and the processing proceeds to step S13. When a single data check of a single event is performed, in step S11, an event occurrence in the browser is detected, the Model related to the event is found in step S12, and the processing proceeds to step S13.

In step S13, the check is performed in the schema. When the whole check is performed, the check is performed on the whole Model as designated by the user script. When the single data check is performed, the check is performed on the Model found in step S12. In step S14, the check result is stored, and the Model management unit refers to the check result. In step S15, the check result of each screen component is determined and the processing ends.

FIG. 11B shows a flow of the detailed processing of step S15 of FIG. 11A.

In step S16, the Model to be checked is found, and whether the check target Model is present or not is determined in step S17. If it is determined that the program for checking is not present in step S17 (i.e., when the determination is No), the processing ends. If it is determined that the target Model is present in step S17 (i.e., when the determination is Yes), whether a program for checking (here, the program is "ValidationHandler" that determines whether the input value is input in the correct form or not) is present or not is determined in step S18. If it is determined that the program for checking is not present in step S18 (i.e., when the determination is No), the processing ends. If it is determined that the program for checking is present in step S18 (i.e., when the determination is Yes), the check is performed, the processing is performed in accordance with the result of the check that determines whether the input value is correct or not in step S19, and the processing is finally ended. The processing in step S19 displays the value in, for example, red when the input value is not correct and displays the value in black when the input value is correct.

Figure 12:
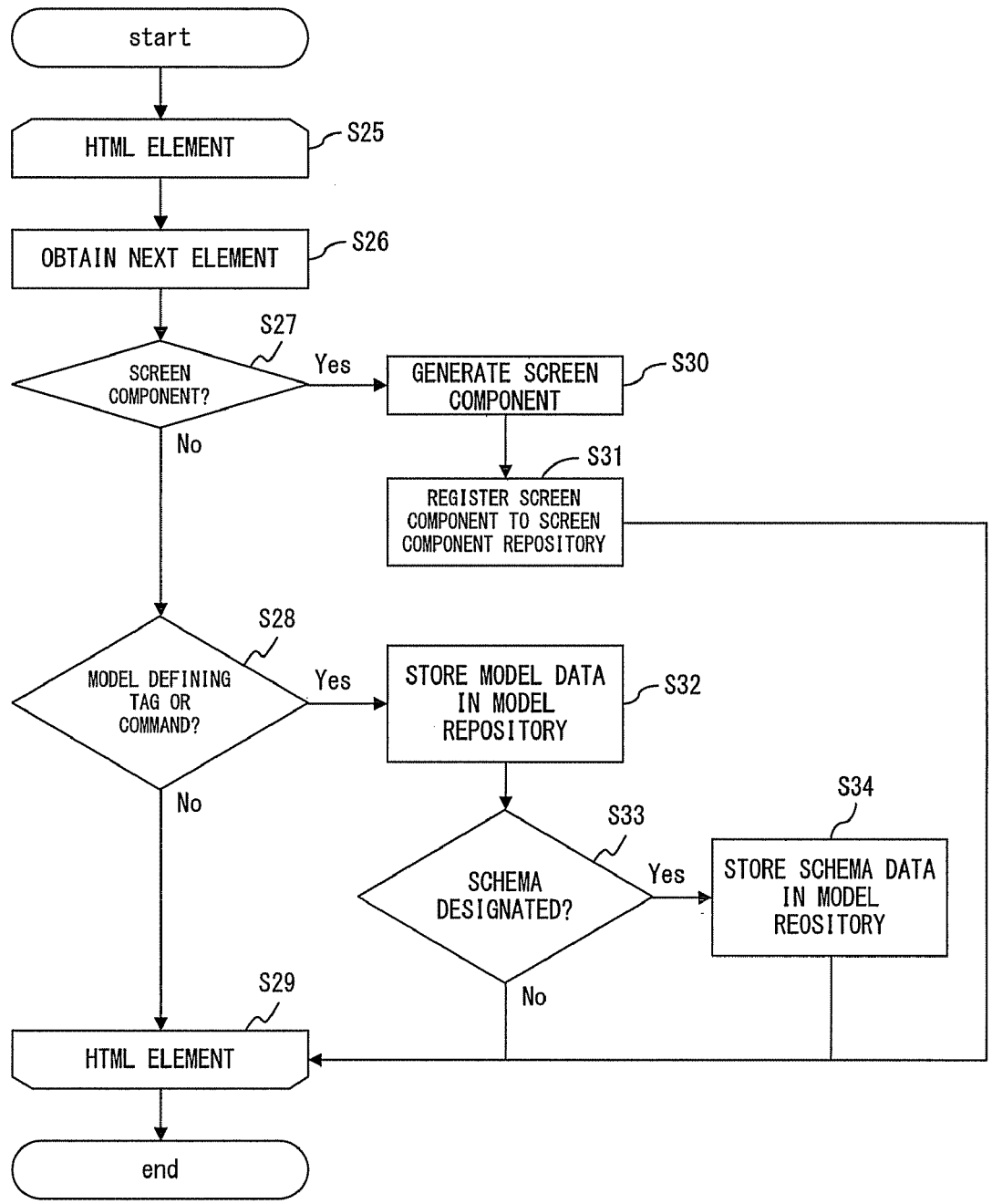
FIG. 12 is a detailed processing flow of the initialization processing.

FIG. 12 is a detailed processing flow of the initialization processing.

In a loop shown in steps S25 through S29, processing of all elements of the HTML texts loaded from the browser is performed. In step S26, the elements of the HTML text are obtained, and whether the obtained elements of the HTML text are the screen component or not is determined in step S27. When the determination in step S27 is No, the processing proceeds to step S28. When the determination in step S27 is Yes, the screen component is generated in step S30, the screen component is registered in the screen component repository in step S31, and the processing proceeds to step S29.

In step S28, whether or not the obtained element of the HTML text is either a Model defining tag or a command is determined. If the determination in step S28 is No, the processing proceeds to step S29. If the determination in step S28 is Yes, in step S32, the data of the Model is stored in the Model repository, and whether a schema is designated or not is determined in step S33. If the determination in step S33 is No, the processing proceeds to step S29. If the determination in step 33 is Yes, the data of the schema is stored in the Model repository, and the processing proceeds to step S29.

It should be noted that in the above case, the screen component repository is provided independently of the Model repository; however, these two can be integrated into one repository if the Model and the screen components can be managed separately.

Figure 13:
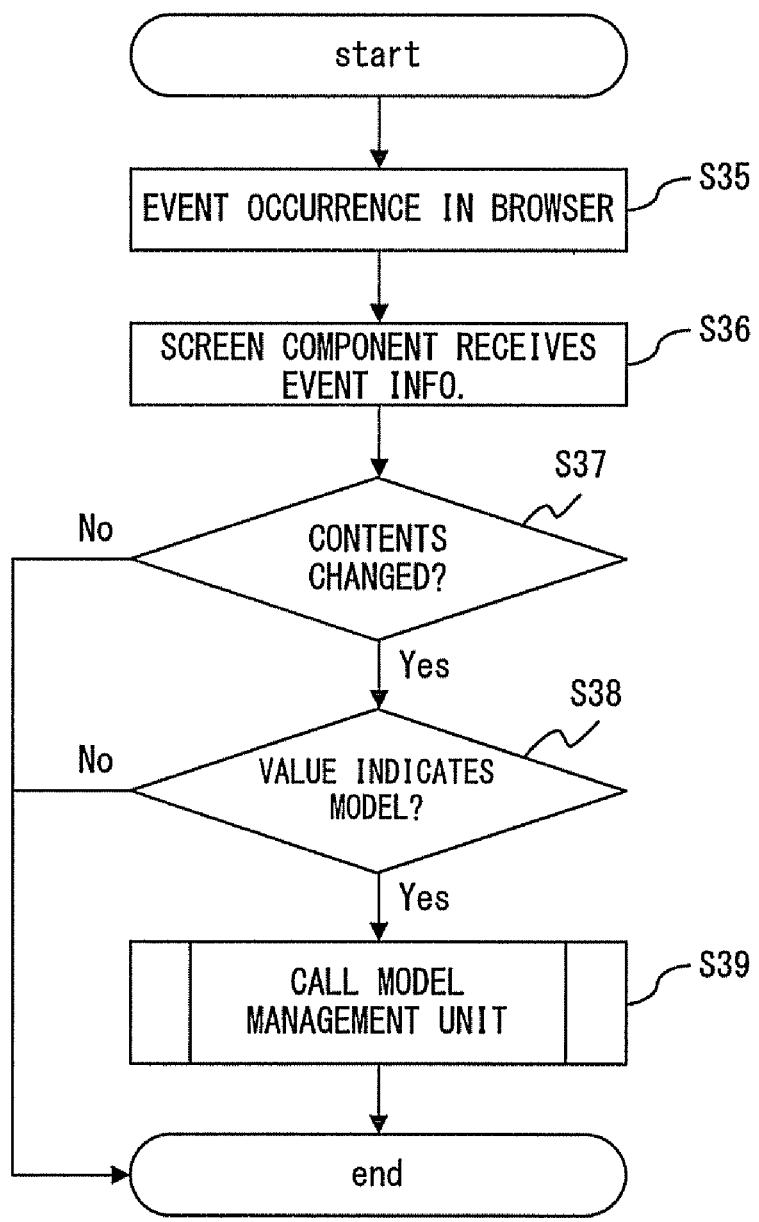
FIG. 13 is a detailed processing flow (1) of a case in which there is a change on the screen and the change is reflected in the Model.
Figure 14:
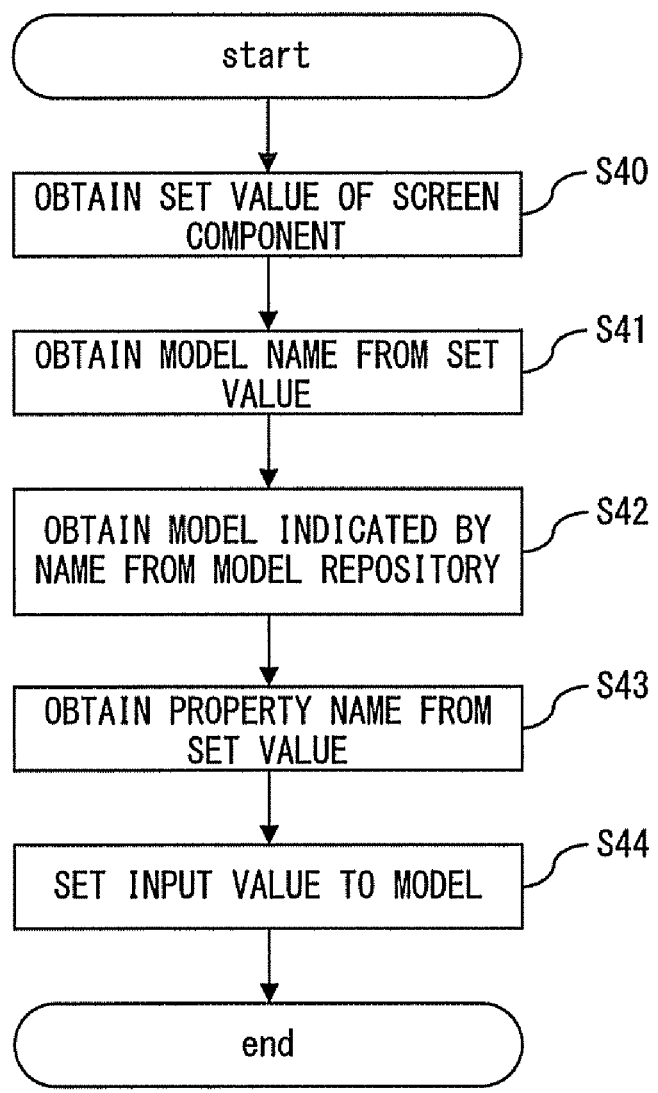
FIG. 14 is a detailed processing flow (2) of a case in which there is a change on the screen and the change is reflected in the Model.

FIG. 13 and FIG. 14 are detailed processing flows of a case in which there is a change in the screen and the change is reflected in the Model.

In FIG. 13, in step S35, the event occurrence in the browser is detected. In step S36, the screen component receives information on the event. In step S37, whether the input contents are changed by the event or not is determined. If the determination in step S37 is No, the processing ends. If the determination in step S37 is Yes, whether the value indicates a Model or not is determined in step S38. In other words, whether the value is in the form of rcf:value="{model.name}" or not is determined. If the determination in step S38 is No, the processing ends. If the determination in step S38 is Yes, in step S39, the Model management unit is called and after the processing of the Model management unit, the processing ends.

FIG. 14 is a processing flow explaining the processing of the Model management unit in the processing flow of FIG. 13.

In step S40, a set value of the screen component is obtained. In other words, the value segment of <span . . . rcf:value="{model.name}"> is obtained. In step S41, the Model name is obtained from the set value. If {model.name} is indicated, for example, the model segment will be obtained. In step S42, the Model indicated by the obtained name is obtained from the Model repository. In step S43, the property name is obtained from the set value. If {model.name} is indicated, for example, the name segment is obtained. In step S44, the input value is set to the Model. In other words, the value input into the screen component is set to the Model.

FIG. 15 is a detailed processing flow of a case in which there is a change in the Model and the change is reflected on the screen.

In step S45, a user executes JavaScript (Registered Trademark). In this case, "setProperty" is executed. As a result of the execution, values retained in the Model are updated in step S46. Next, in a loop from step S47 through S53, processing is performed on all screen components in the screen component repository. In step S48, one screen component is obtained. In step S49, whether the value retained by the screen component indicates a Model or not is determined. "The value indicates a Model" means the same as the operation in step S38 of FIG. 13. If the determination in step S49 is No, the processing proceeds to step S53. If the determination in step S49 is Yes, whether the value indicating a Model is updated or not is determined in step S50. If the determination in step S50 is No, the processing proceeds to step S53. If the determination in step S50 is Yes, the value is set to the screen component in step S51, the screen component updates the display in step S52, and the processing proceeds to step S53. When the processing in a loop from step S47 through S53 on all screen components ends, the processing ends.

FIG. 16 through FIG. 20 are detailed processing flows explaining the checking operation processing when the whole check is performed.

Figure 16:
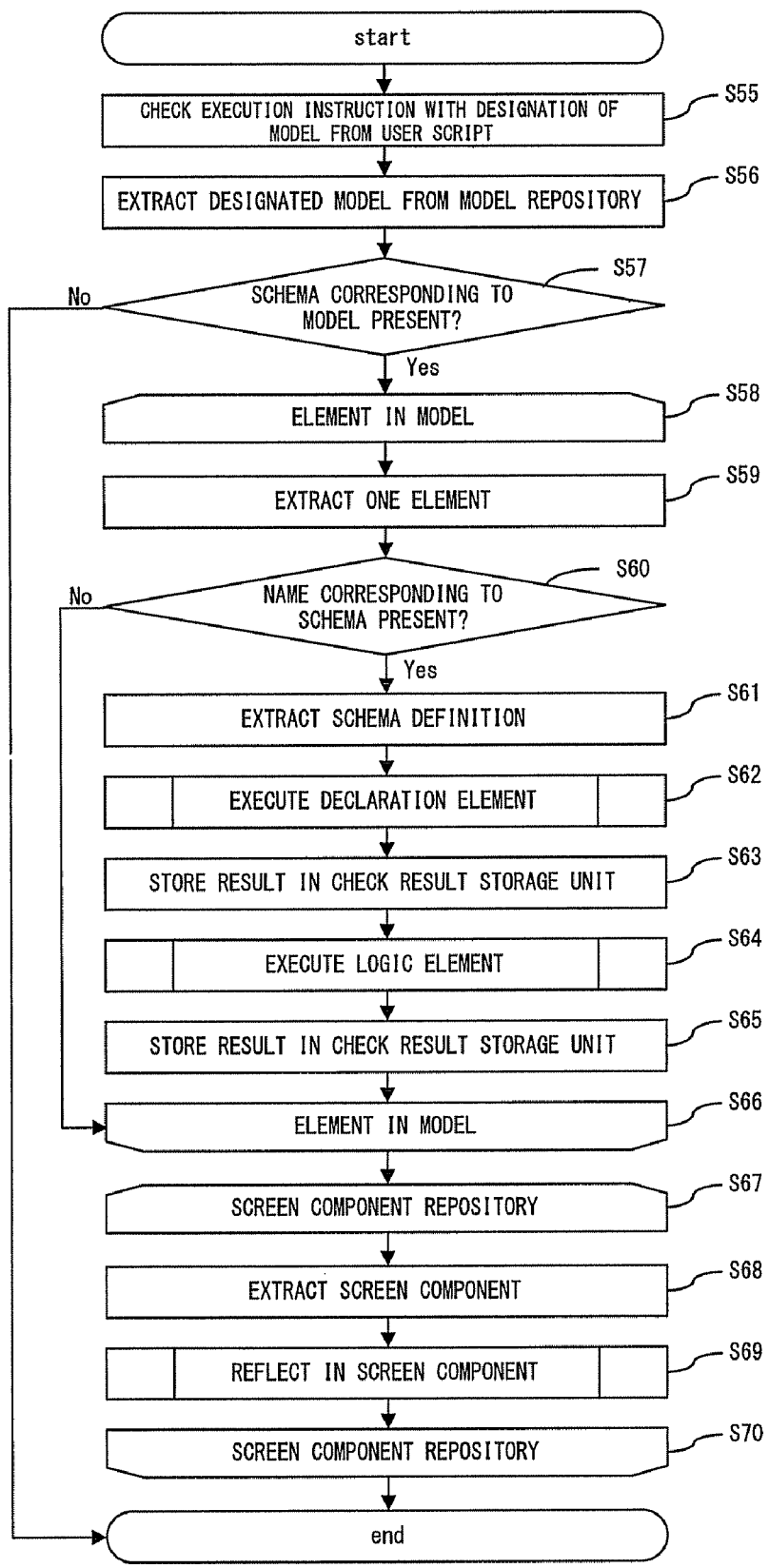
FIG. 16 is a detailed processing flow (1) explaining the checking operation processing when the check is performed entirely.

In FIG. 16, in step S55, a Model is designated from the user script, and the check execution instruction is sent. In step S56, the indicated Model is obtained from the Model repository, and in step S57, whether the schema corresponding to the Model is present or not is determined. If the determination in step S57 is No, the processing ends. If the determination in step S57 is Yes, the following processing is performed on all elements in the Model in a loop from step S58 through step S66. In step S59, an element of the Model is obtained. In step S60, whether a name corresponding to the schema is present in the element or not is determined. If the determination in step S60 is No, the processing proceeds to step S66. If the determination in step S60 is Yes, in step S61, the schema definition is extracted, and in step S62, the declaration element is executed. The result is stored in the check result storage unit in step S63, the logic element is executed in step S64, the result is stored in the check result storage unit in step S65, and the processing proceeds to step S66. When the processing on all elements in the Model ends in the loop from step S58 through step S66, the processing proceeds to step S67.

In a loop from step S67 through step S70, the following processing is performed on all screen components stored in the screen component repository. In step S68, the screen component is extracted, the check result is reflected in the screen component in step S69, and the processing proceeds to step S70. When the processing of all screen components stored in the screen component repository in the loop from step S67 through step S70, the entire processing ends.

Figure 17:
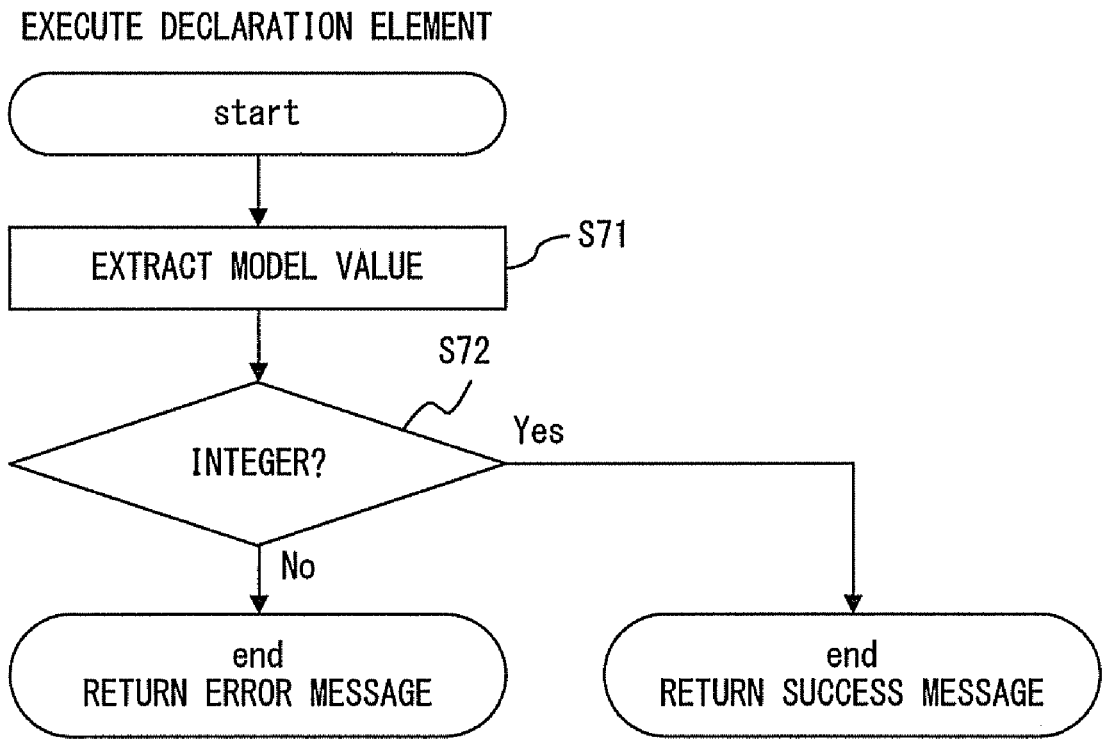
FIG. 17 is a detailed processing flow (2) explaining the checking operation processing when the check is performed entirely.

FIG. 17 is a detailed flow of step S62 in FIG. 16.

When a declaration element is executed, in step S71, the value in the Model is extracted, and in step S72, whether the value is an integer or not, for example, is determined. This is an instance of "type: integer". Additionally, various checks can be performed in accordance with certain properties. For example, in an instance of "type: zenkaku", whether a character string is a two-byte character string or not is determined. In an instance of "maxLength: 12", whether the number of characters is less than or equal to 12 or not is determined. If the determination in step S72 is No, an error message is returned, and if the determination is Yes, a message that the check has been successful is returned.

Figure 18:
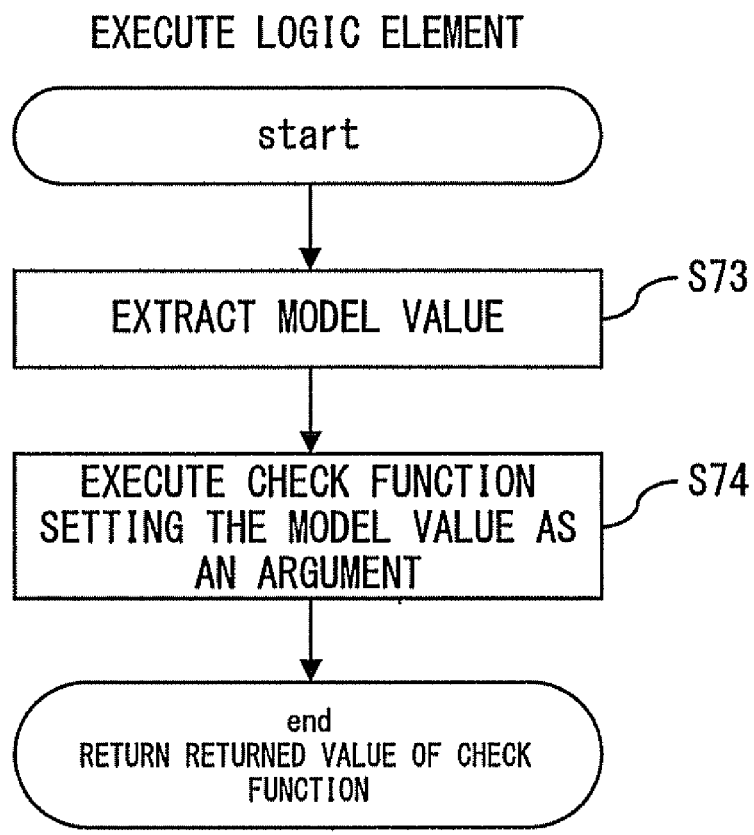
FIG. 18 is a detailed processing flow (3) explaining the checking operation processing when the check is performed entirely.

FIG. 18 is a detailed flow of step S64 in FIG. 16.

When a logic element is executed, in step S73, the value in the Model is extracted, and a check function is executed setting the value of the Model as an argument in step S74. The returned value of the check function is returned to the flow in FIG. 16. The check function returns a value indicating success or failure as the returned value.

FIG. 19 is a detailed flow of step S67 in FIG. 16.

When a change is reflected in the screen component, in step S75, whether the value indicates a Model or not is determined. This determination is made in the same manner as the determination in step S49 in FIG. 15. If the determination in step S75 is No, the processing ends. If the determination in step S75 is Yes, whether an action component (function component) is present or not is determined in step S76. If the determination in step S76 is No, the processing ends. If the determination in step S76 is Yes, the action component is called in step S77, and the action component is executed. Afterwards, the processing ends.

Figure 20:
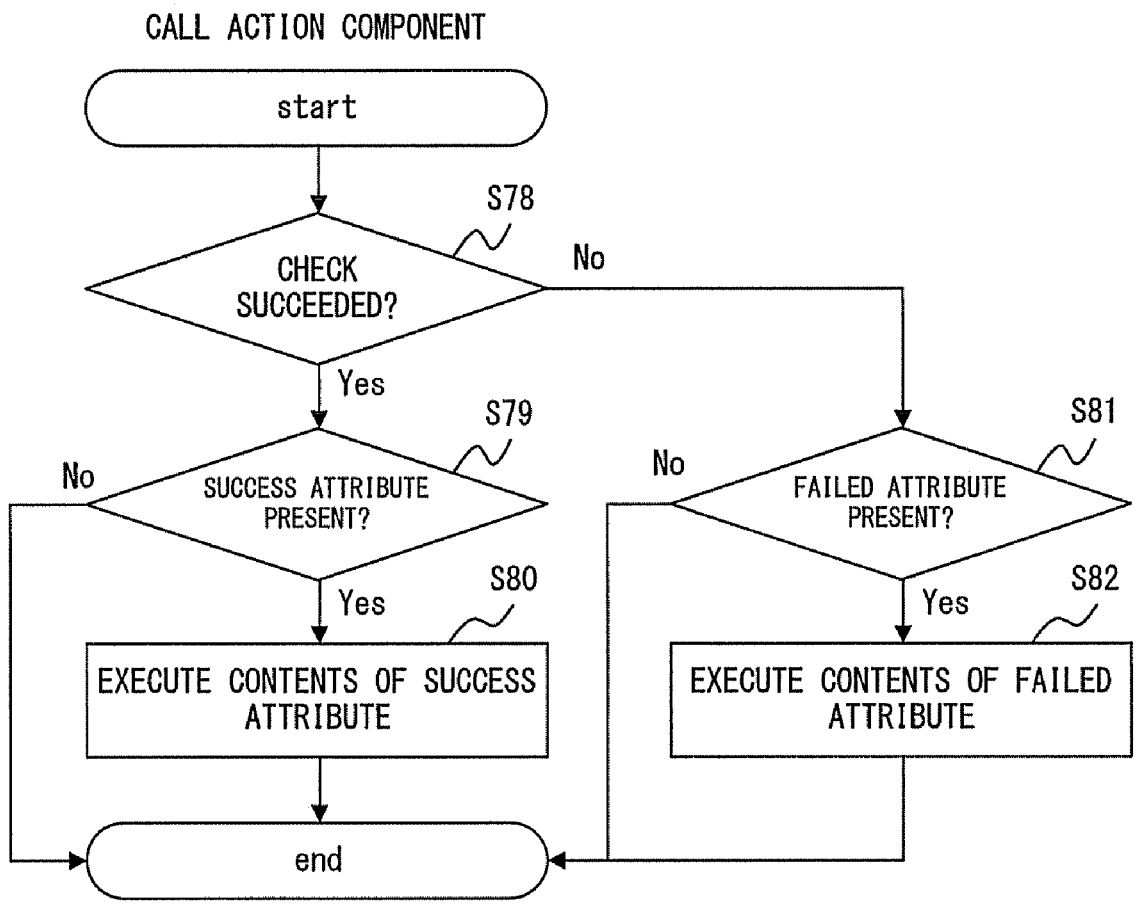
FIG. 20 is a detailed processing flow (5) explaining the checking operation processing when the check is performed entirely.

FIG. 20 is a detailed flow of step S77 in FIG. 19.

When the action component is called and executed, in step S78, whether the check has succeeded or not is determined. If the determination in step S78 is Yes, the processing proceeds to step S79, and whether a success attribute is present or not is determined. If the determination in step S79 is No, the processing ends. If the determination in step S79 is Yes, the content of the success attribute is executed in step S80, and the processing ends.

If the determination in step S78 is No, whether a failed attribute is present or not is determined in step S81. If the determination in step S81 is No, the processing ends. If the determination in step S81 is Yes, the content of the failed attribute is executed in step S82, and the processing ends.

FIG. 21 through FIG. 26 are detailed processing flows explaining the checking operation processing when the single data check operation is performed.

In FIG. 21, when an event occurs in the browser in step S90, the screen component receives the information on the event in step S91, and whether the screen component indicates a Model or not is determined in step S92. The determination is, in other words, a determination of whether the screen component has a Model associated with it by binding or not. If the determination in step S92 is No, the processing ends. If the determination in step S92 is Yes, whether an action component is present or not is determined in step S93. If the determination in step S93 is No, the processing ends. If the determination in step S93 is Yes, whether an event attribute is present or not is determined in step S94. If the determination in step S94 is No, the processing ends. If the determination in step S94 is Yes, whether the event is a check target event or not is determined in step S95. If the determination in step S95 is No, the processing ends. If the determination in step S95 is Yes, the check is executed in step S96 and the processing ends.

FIG. 22 is a detailed flow of step S96 in FIG. 21.

In step S97, a target Model is extracted from the Model repository, and whether a schema corresponding to the Model is present or not is determined in step S98. If the determination in step S98 is No, the processing ends. If the determination step S98 is Yes, an element of the Model indicated by the screen component is extracted in step S99. In step 100, whether a name corresponding to the schema is present or not is determined. If the determination in step S100 is No, the processing ends. If the determination in step S100 is Yes, the schema definition is extracted in step S101, the declaration element is executed in step S102, and the result is stored in the check result storage unit in step S103. In step S104, a logic element is executed, and the result is stored in the check result storage unit in step S105. In step S106, the result is reflected in the screen component, and the processing ends.

Figure 23:
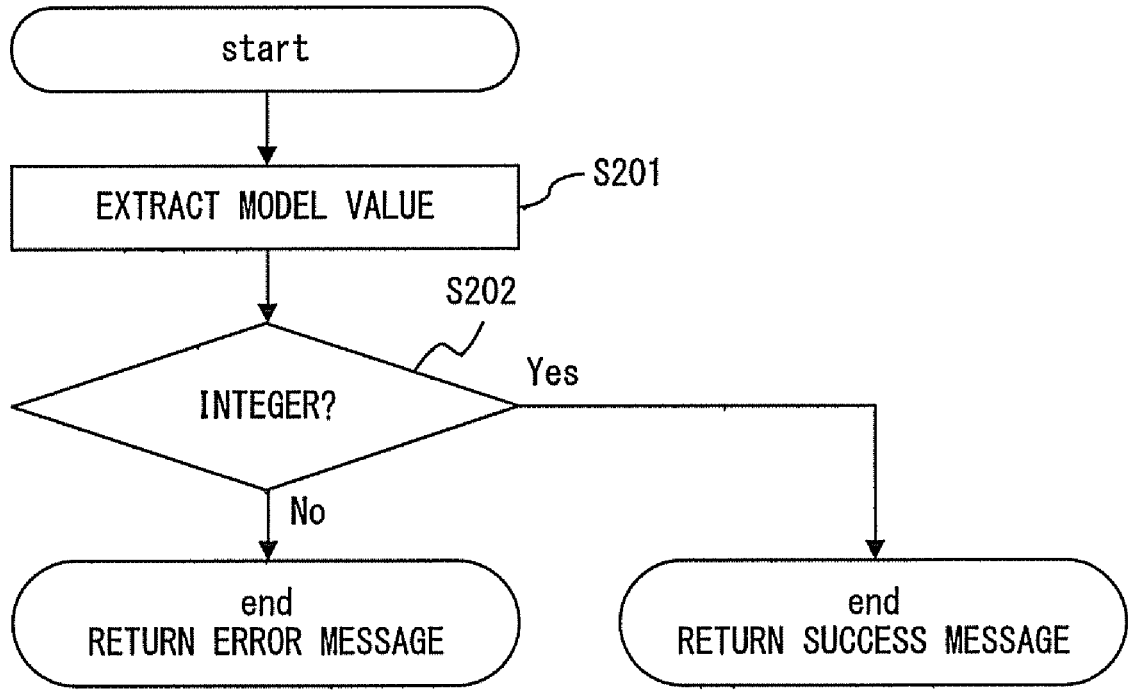
FIG. 23 is a detailed processing flow (3) explaining the checking operation processing when the single data check operation is performed.

FIG. 23 is a detailed flow of step S102 in FIG. 22.

When a declaration element is executed, a value of the model is executed in step S201, and whether the value is an integer or not, for example, is determined in step S202. This is an instance of "type: integer" Additionally, various checks can be performed in accordance with certain properties. For example, in an instance of "type: zenkaku", whether a character string is a two-byte character string or not is determined. In an instance of "maxLength: 12", whether the number of characters is less than or equal to 12 or not is determined. If the determination in step S202 is No, an error message is returned, and if the determination is Yes, a message that the check has been successful is returned.

Figure 24:
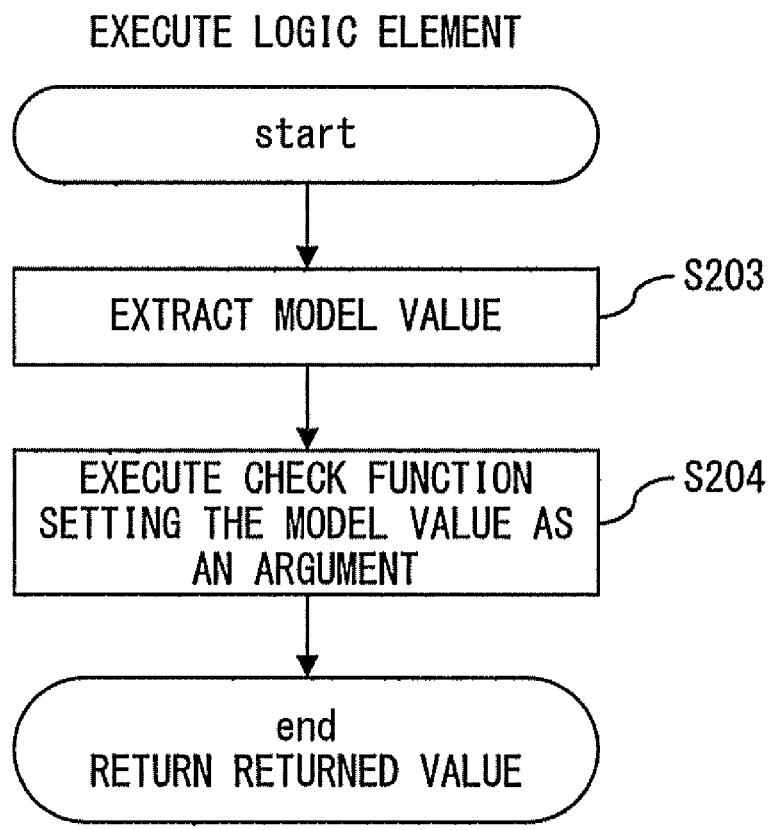
FIG. 24 is a detailed processing flow (4) explaining the checking operation processing when the single data check operation is performed.

FIG. 24 is a detailed flow of step S104 in FIG. 22. When a logic element is executed, in step S203, the value in the Model is extracted, and a check function is executed setting the value of the Model as an argument in step S204. The returned value of the check function is returned to the flow in FIG. 16. The check function returns a value indicating success or failure as the returned value.

Figure 25:
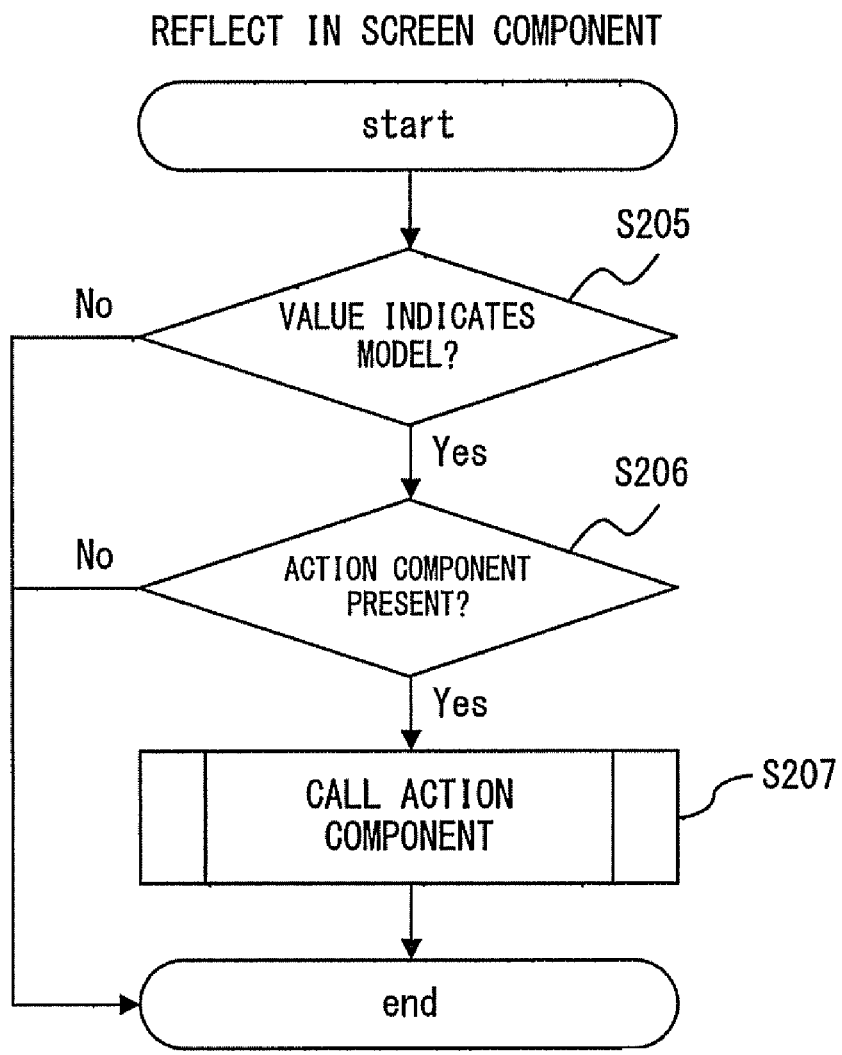
FIG. 25 is a detailed processing flow (5) explaining the checking operation processing when the single data check operation is performed.

FIG. 25 is a detailed flow of step S106 in FIG. 22.

When a change is reflected in the screen component, in step S205, whether the value indicates a Model or not is determined. This determination is made in the same manner as the determination in step S49 in FIG. 15. If the determination in step S205 is No, the processing ends. If the determination in step S205 is Yes, whether an action component (function component) is present or not is determined in step S206. If the determination in step S206 is No, the processing ends. If the determination in step S206 is Yes, the action component is called in step S207, and the action component is executed. Afterwards, the processing ends.

Figure 26:
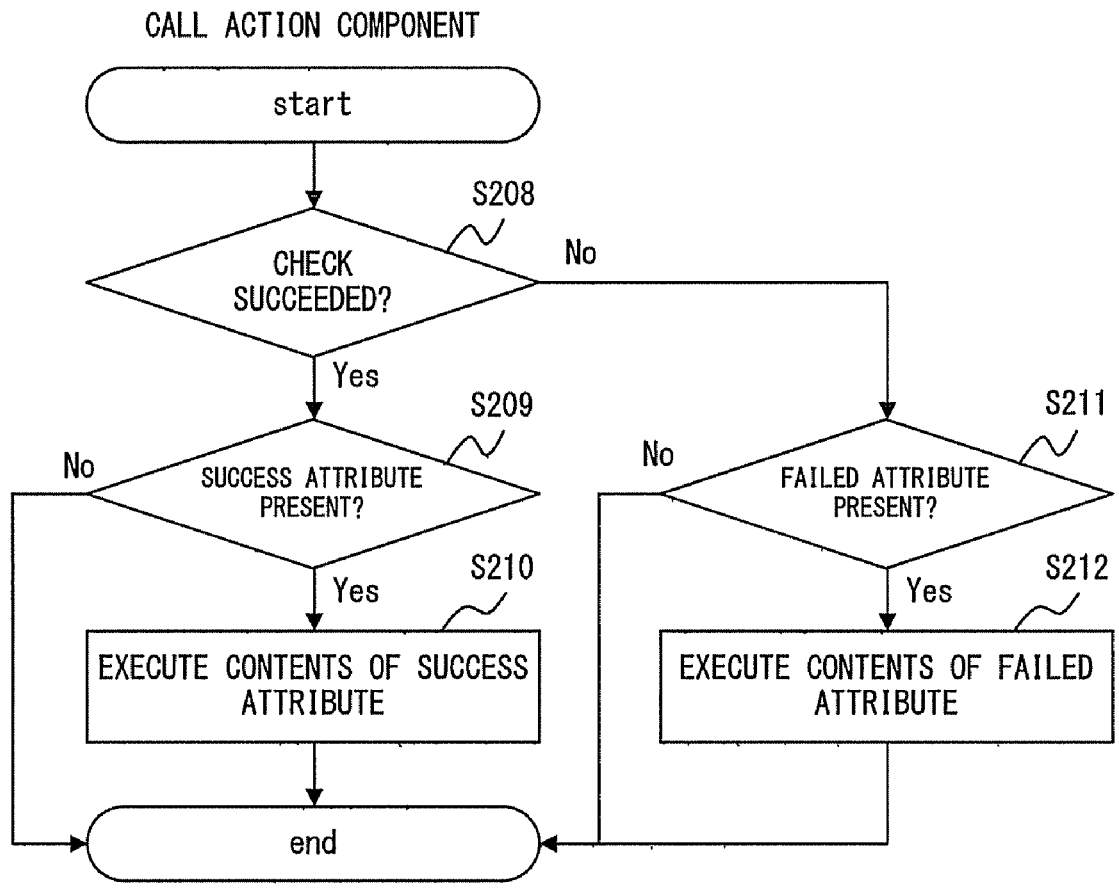
FIG. 26 is a detailed processing flow (6) explaining the checking operation processing when the single data check operation is performed.

FIG. 26 is a detailed flow of step S207 in FIG. 25.

When the action component is called and executed, in step S208, whether the check has succeeded or not is determined. If the determination in step S208 is Yes, the processing proceeds to step S209, and whether a success attribute is present or not is determined. If the determination in step S209 is No, the processing ends. If the determination in step S209 is Yes, the contents of the success attribute is executed in step S210, and the processing ends.

If the determination in step S208 is No, whether a failed attribute is present or not is determined in step S211. If the determination in step S211 is No, the processing ends. If the determination in step S211 is Yes, the content of the failed attribute is executed in step S212 and the processing ends.

What is claimed is:

1. A computer readable storage medium storing a program causing a computer to realize a display screen structuring apparatus structuring a display screen using a description in a non-object-oriented language and to realize a function comprising:

a view unit which displays a display screen, receives an event input of a user from the display screen conducts a display reflecting a result of a check for the event input on the display screen;

a model unit that is provided separately from the view unit and that is associated with the view unit by a binding function, which stores an input value of the event input in a model repository;

a schema unit that is provided separately from the view unit and the model unit and that is associated with the model unit by a second binding function, which detects the input value stored in the model repository, examines whether the input value detected satisfies a specified condition or not and requests the view unit for reflecting a result of the examining on the display screen as the result of the check for the event input; and an action component that is associated with a display component and that performs an operation on the display component according to an action definition that defines operations to be performed when the result of the check is successful and when the result of the check fails, respectively, wherein a check of input values is conducted without having a mechanism for performing the check of input values in each screen component during the loading process.

2. The computer readable storage medium storing the program according to claim 1, wherein
the non-object-oriented language is JavaScript.

3. The computer readable storage medium storing the program according to claim 1, wherein
the event input is a text input, and
the schema unit examines whether all input text relating to the model unit satisfies a prescribed condition or not.

4. The computer readable storage medium storing the program according to claim 1, wherein
the event input is a text input, and
the schema unit examines, with respect to only a text to which an event occurs from among the input text relating to the model unit, whether the text satisfies a prescribed condition or not.

5. A display screen structuring apparatus structuring a display screen using a description in a non-object-oriented language, comprising:
a view unit which displays a display screen, receives an event input of a user from the display screen and conducts a display reflecting a result of a check for the event input on the display screen;
a model unit that is provided separately from the view unit and that is associated with the view unit by a binding function, which stores an input value of the event input in a model repository; and
a schema unit that is provided separately from the view unit and the model unit and that is associated with the model unit by a second binding function, which detects the input value stored in the model repository, examines whether the input value detected satisfies a specified condition or not and requests the view unit for reflecting a result of the examining on the display screen as the result of the check for the event input; and
an action component that is associated with a display component and that performs an operation on the display component according to an action definition that defines operations to be performed when the result of the check is successful and when the result of the check fails, respectively,
wherein a check of input values is conducted without having a mechanism for performing the check of input values in each screen component during the loading process.

6. The computer-readable recording medium according to claim 1, wherein
the model unit registers, using a first binding definition including a model and the specified condition, the model and the specified condition to the model repository by making correspondence of the model and the specified condition, sets, using a second binding definition corresponding a display component with the model, the input value to the model in the model repository corresponding to the display component of which the view unit receives the event input, and
the schema unit examines whether or not the input value satisfies the specified condition registered in the model repository by corresponded with the model.

7. The computer-readable recording medium according to claim 6, wherein
the schema unit checks whether or not a changed input value satisfies the specified condition using a schema definition registered in the model repository with respect to the model among models registered in the model repository, to which a value is changed in response to a user script, and requests the view unit to reflect a result of the check, and
the view unit executes the reflection to a display of the display screen using a request requesting reflection of the result of the check.

* * * * *